US012609816B2

(12) United States Patent
Suriyanarayanan et al.

(10) Patent No.: US 12,609,816 B2
(45) Date of Patent: Apr. 21, 2026

(54) DYNAMIC CREATION OF CONTEXTUAL PROTECTIVE SHIELD TO PROTECT CARDS USING NEUROMORPHIC TINY AI MODULE AND DYNAMIC SHORT CODE HASHING

(71) Applicant: Bank of America Corporation, Charlotte, NC (US)

(72) Inventors: Gowri Sundar Suriyanarayanan, Chennai (IN); Abhijit Behera, Hyderabad (IN); Maneesh Kumar Sethia, Telangana (IN); Vignesh A. S, Tamil Nadu (IN); Aiswary R, Tamil Nadu (IN)

(73) Assignee: Bank of America Corporation, Charlotte, NC (US)

( * ) Notice: Subject to any disclaimer, the term of this patent is extended or adjusted under 35 U.S.C. 154(b) by 86 days.

(21) Appl. No.: 18/811,906

(22) Filed: Aug. 22, 2024

(65) Prior Publication Data

US 2026/0058801 A1 Feb. 26, 2026

(51) Int. Cl.
| | |
|---|---|
| *H04L 29/06* | (2006.01) |
| *G06N 20/00* | (2019.01) |
| *G06Q 20/34* | (2012.01) |
| *G06Q 20/38* | (2012.01) |
| *H04L 9/08* | (2006.01) |

(52) U.S. Cl.
CPC ........... *H04L 9/0838* (2013.01); *G06N 20/00* (2019.01); *G06Q 20/341* (2013.01); *G06Q 20/3829* (2013.01); *H04L 9/0822* (2013.01); *H04L 9/0866* (2013.01); *H04L 9/0877* (2013.01)

(58) Field of Classification Search
None
See application file for complete search history.

(56) References Cited

U.S. PATENT DOCUMENTS

| | | | |
|---|---|---|---|
| 7,181,438 B1 * | 2/2007 | Szabo ................ | G06Q 30/0269 705/14.27 |
| 2023/0173395 A1 | 6/2023 | Cella et al. | |
| 2023/0206261 A1 | 6/2023 | Cella et al. | |

(Continued)

*Primary Examiner* — Andrew J Steinle
(74) *Attorney, Agent, or Firm* — Banner & Witcoff, Ltd.

(57) ABSTRACT

Neuromorphic intelligent card systems enhance the security and efficiency of electronic transactions with neuromorphic sensory nodes, Tiny AI modules, and memristor-based Tiny-DBs to provide real-time validation and secure data handling during transactions. The system captures and analyzes data patterns from external devices, such as POS terminals, using dynamic short codes and vendor-specific encryption keys. The neuromorphic AI module decrypts and compares the incoming data against pre-stored patterns for authentication. If validated, the system encrypts and transmits the transaction data. Robust data synchronization processes allow the card to update its security credentials and transaction logs with external systems, even in the absence of a mobile device. Secure communication is maintained through dynamic encryption keys that protect all data exchanges, ensuring confidentiality and integrity. The system provides a comprehensive, modular approach to secure electronic transactions, mitigating risks of fraud and unauthorized access while ensuring consistent and reliable data synchronization across various platforms.

20 Claims, 8 Drawing Sheets

(56)            References Cited

U.S. PATENT DOCUMENTS

| | | | |
|---|---|---|---|
| 2023/0206329 A1 | 6/2023 | Cella et al. | |
| 2023/0214925 A1* | 7/2023 | Cella | G06Q 30/06 |
| | | | 705/37 |
| 2023/0316075 A1 | 10/2023 | Cella et al. | |
| 2023/0316305 A1 | 10/2023 | Cella et al. | |
| 2023/0316357 A1 | 10/2023 | Cella et al. | |
| 2023/0325720 A1 | 10/2023 | Cella et al. | |
| 2023/0325811 A1 | 10/2023 | Cella et al. | |
| 2023/0325816 A1 | 10/2023 | Cella et al. | |
| 2023/0325829 A1 | 10/2023 | Cella et al. | |
| 2023/0342346 A1 | 10/2023 | Cella et al. | |
| 2023/0351292 A1 | 11/2023 | Cella et al. | |
| 2023/0351371 A1 | 11/2023 | Cella et al. | |
| 2023/0351393 A1 | 11/2023 | Cella et al. | |
| 2023/0410090 A1 | 12/2023 | Cella et al. | |
| 2023/0410093 A1 | 12/2023 | Cella et al. | |
| 2023/0410095 A1 | 12/2023 | Cella et al. | |
| 2023/0419277 A1 | 12/2023 | Cella et al. | |
| 2023/0419304 A1 | 12/2023 | Cella et al. | |

* cited by examiner

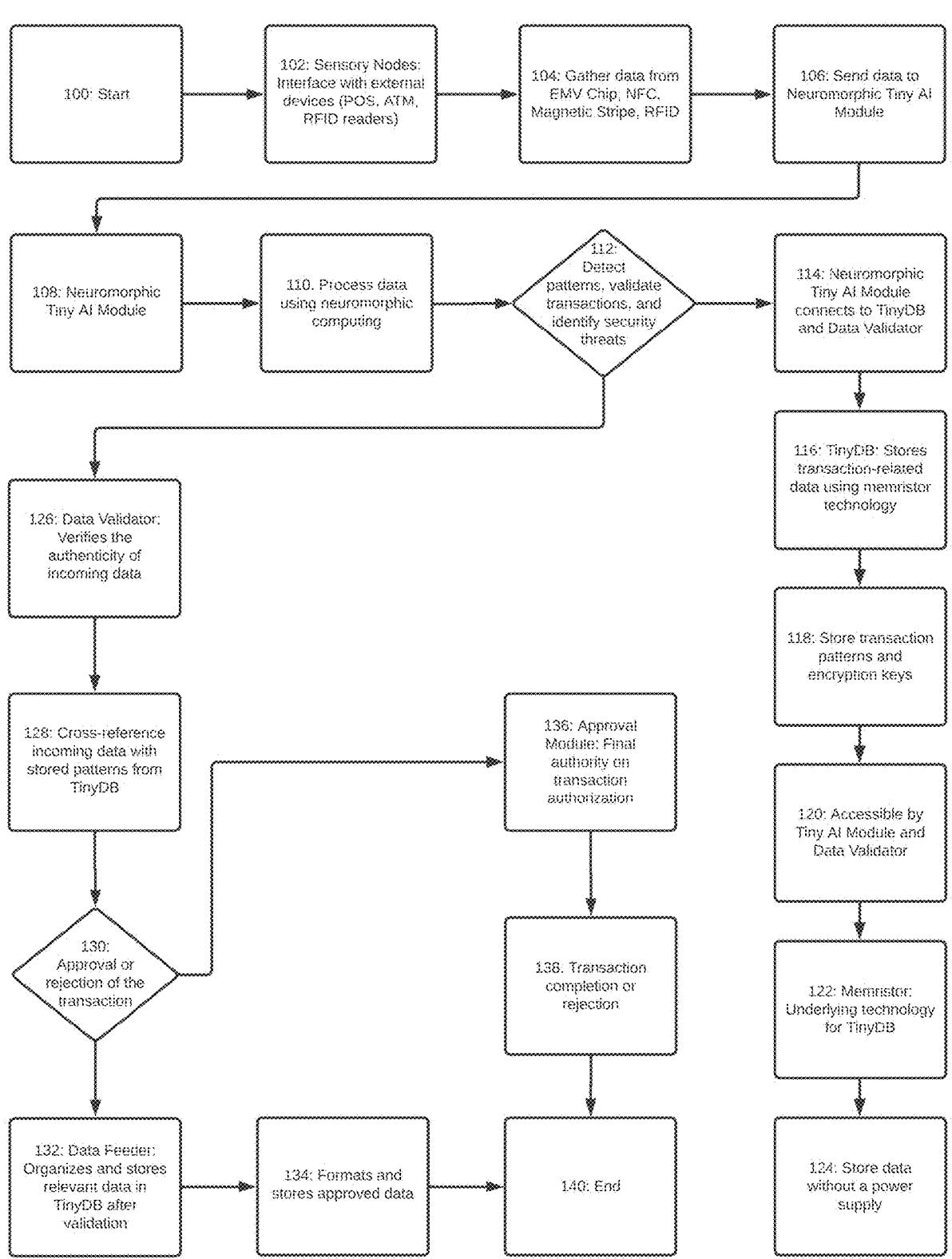
FIG. 1: System/Process To Dynamically Create Contextual Protective Shield To Protect Cards Using Neuromorphic Tiny AI Module And Dynamic Short Code Hashing

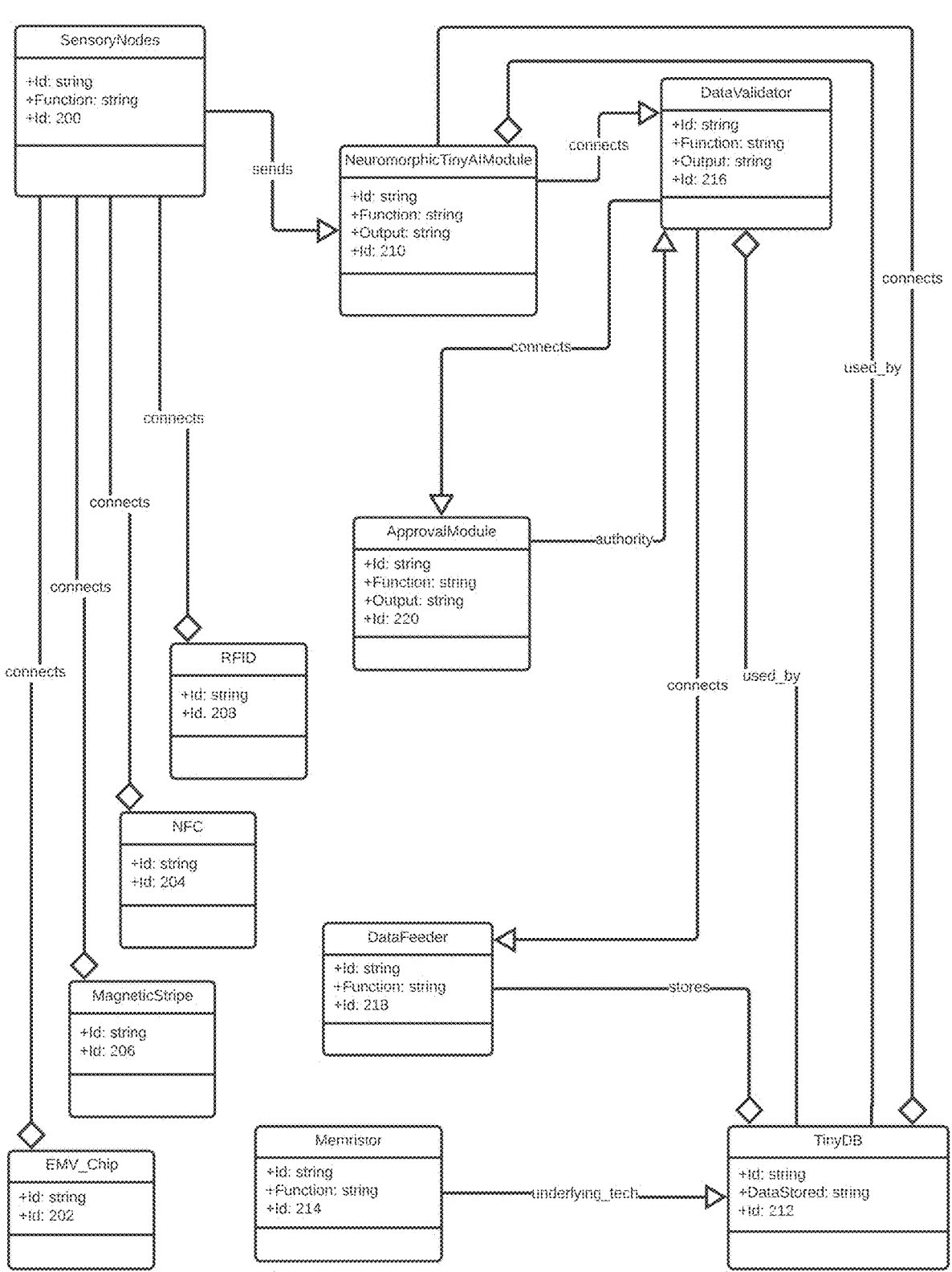
FIG. 2: Entity Relationship Diagram for Technique To Dynamically Create Contextual Protective Shield To Protect Cards Using Neuromorphic Tiny AI Module And Dynamic Short Code Hashing

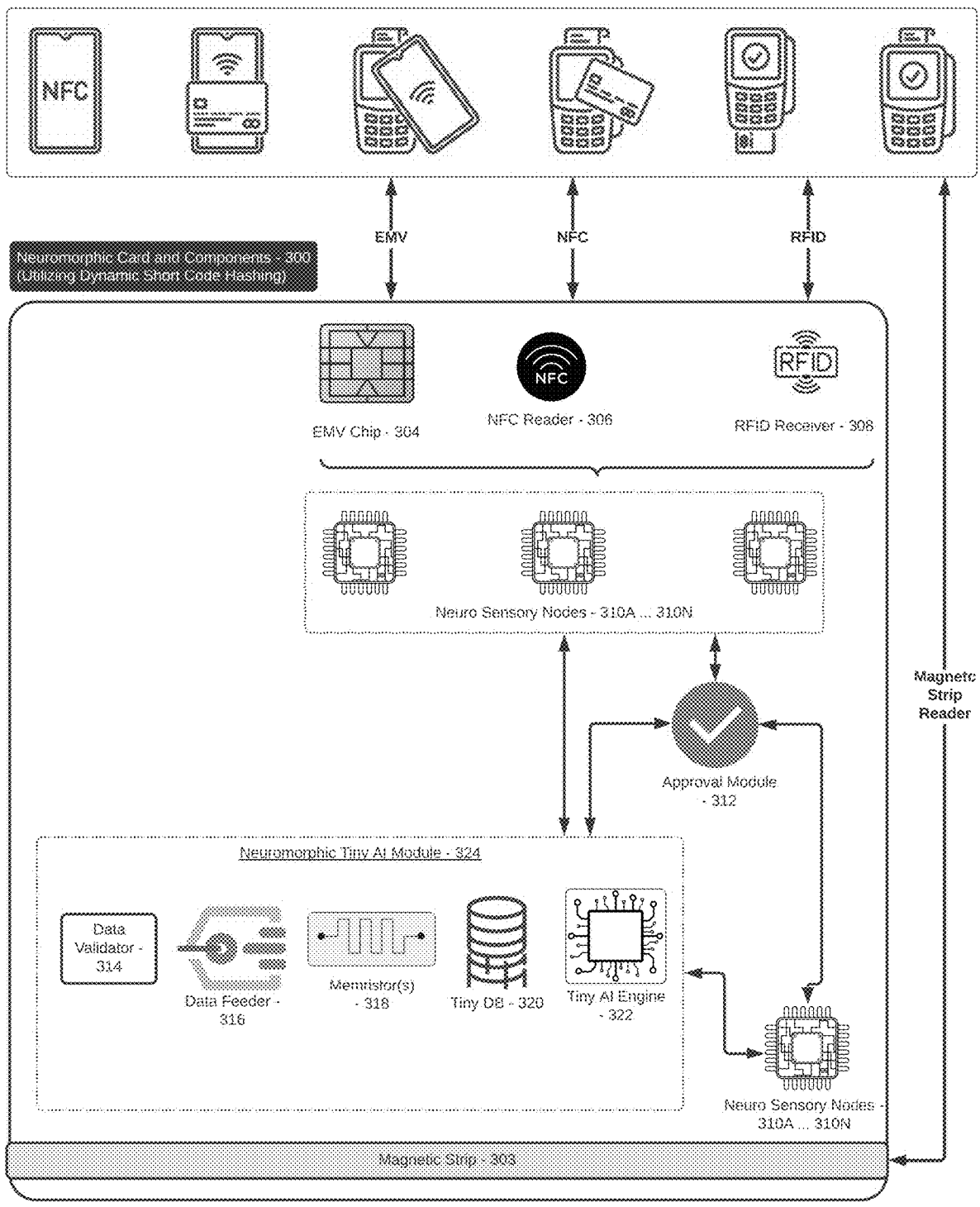
FIG. 3: Sample System and Components for Neuromorphic Card To Dynamically Create Contextual Protective Shield To Protect Cards Using Tiny AI Module And Dynamic Short Code Hashing

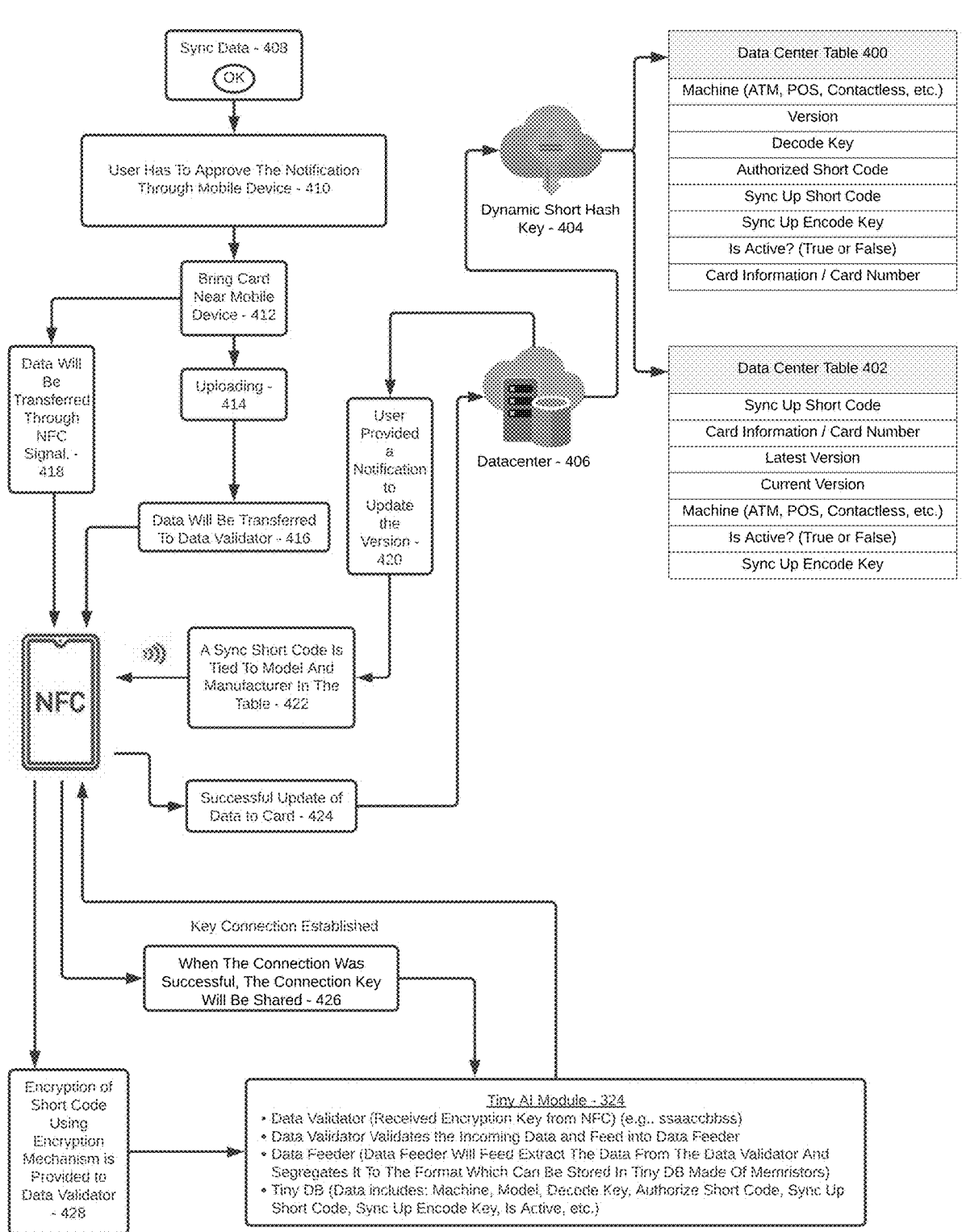
FIG. 4: Sample System Process for Updating Data to Card Process Flow

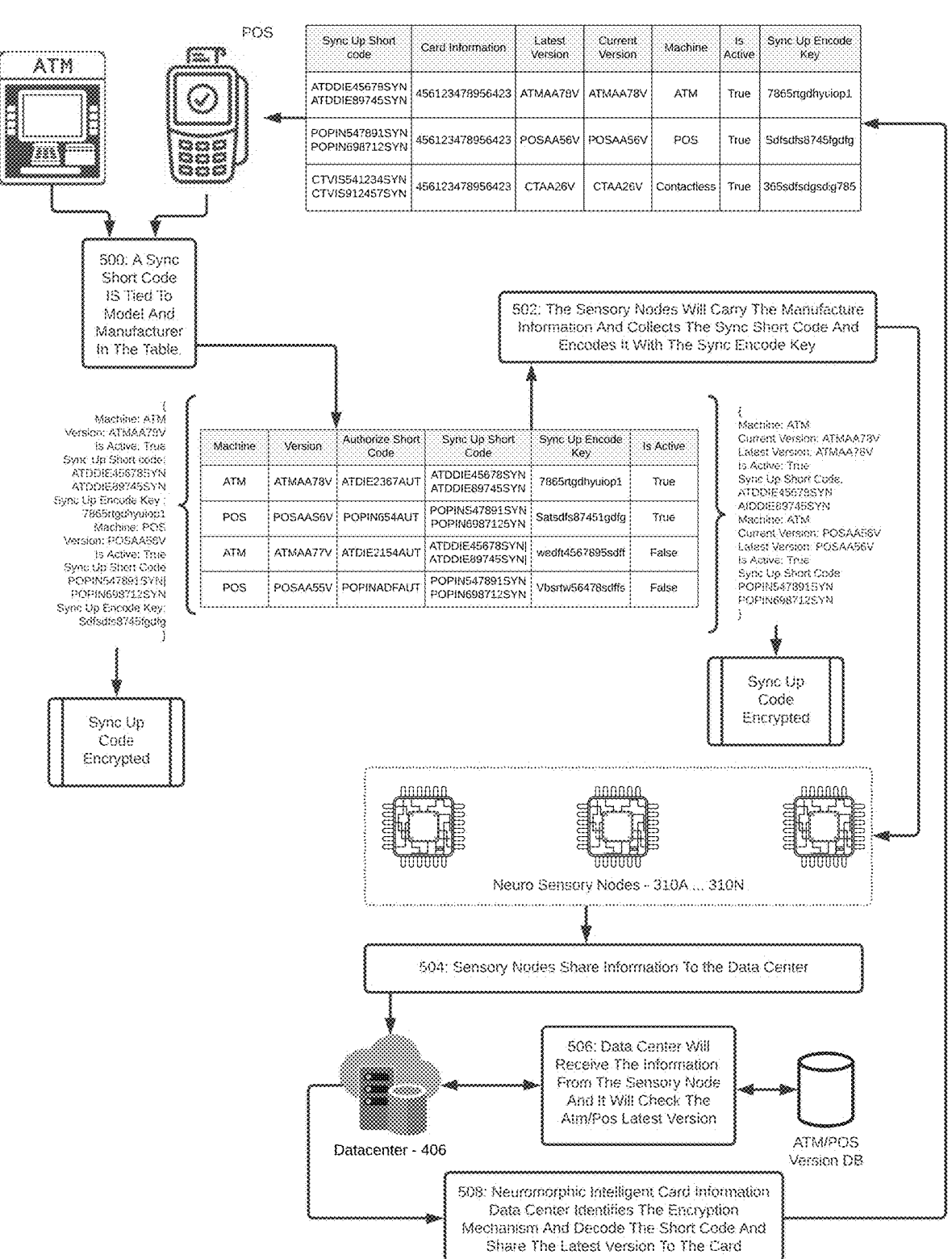
FIG. 5: Sample System Process for Data Sync Up with ATM and POS Flow

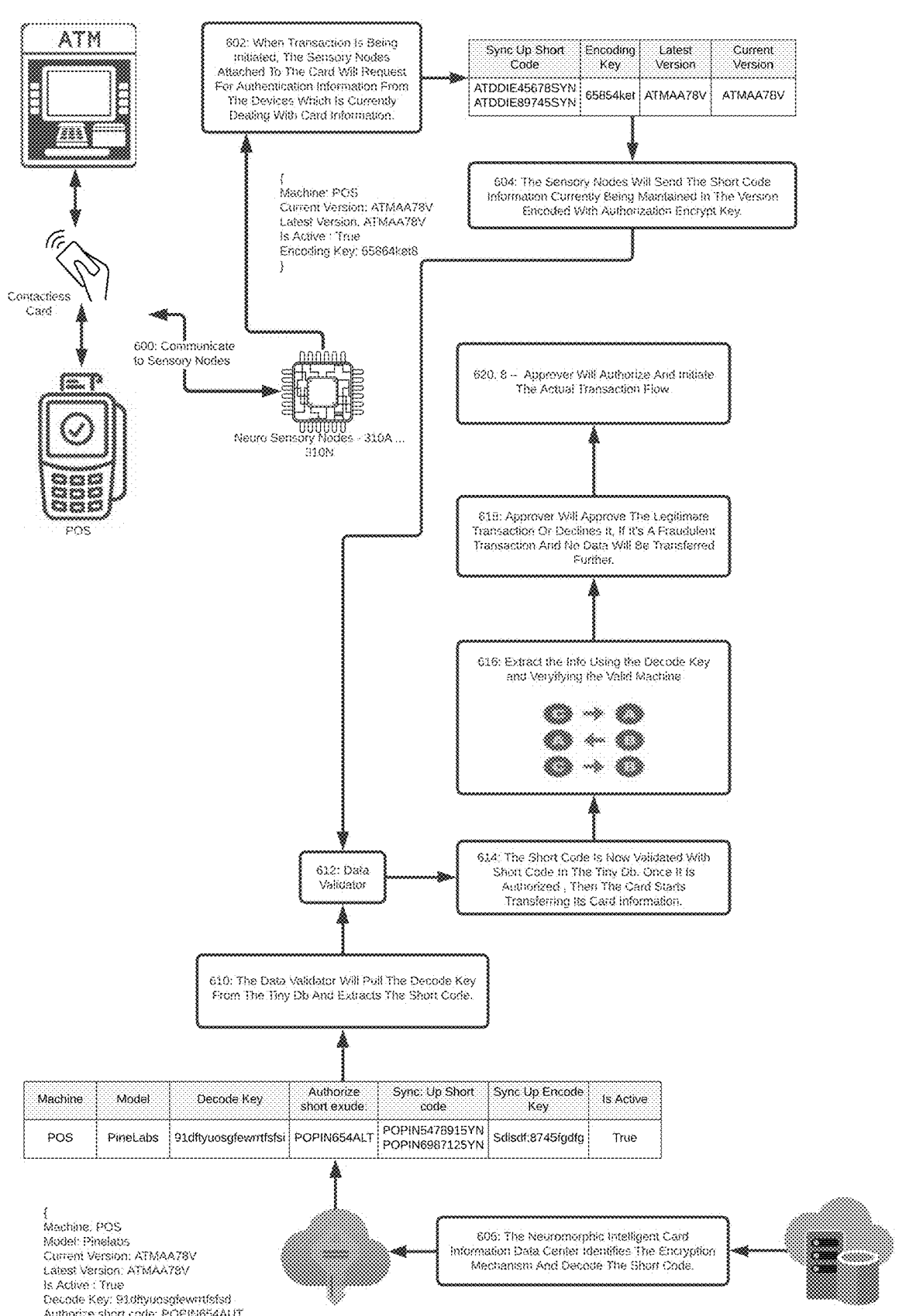
FIG. 6: Sample System Process for Transaction Validation Flow

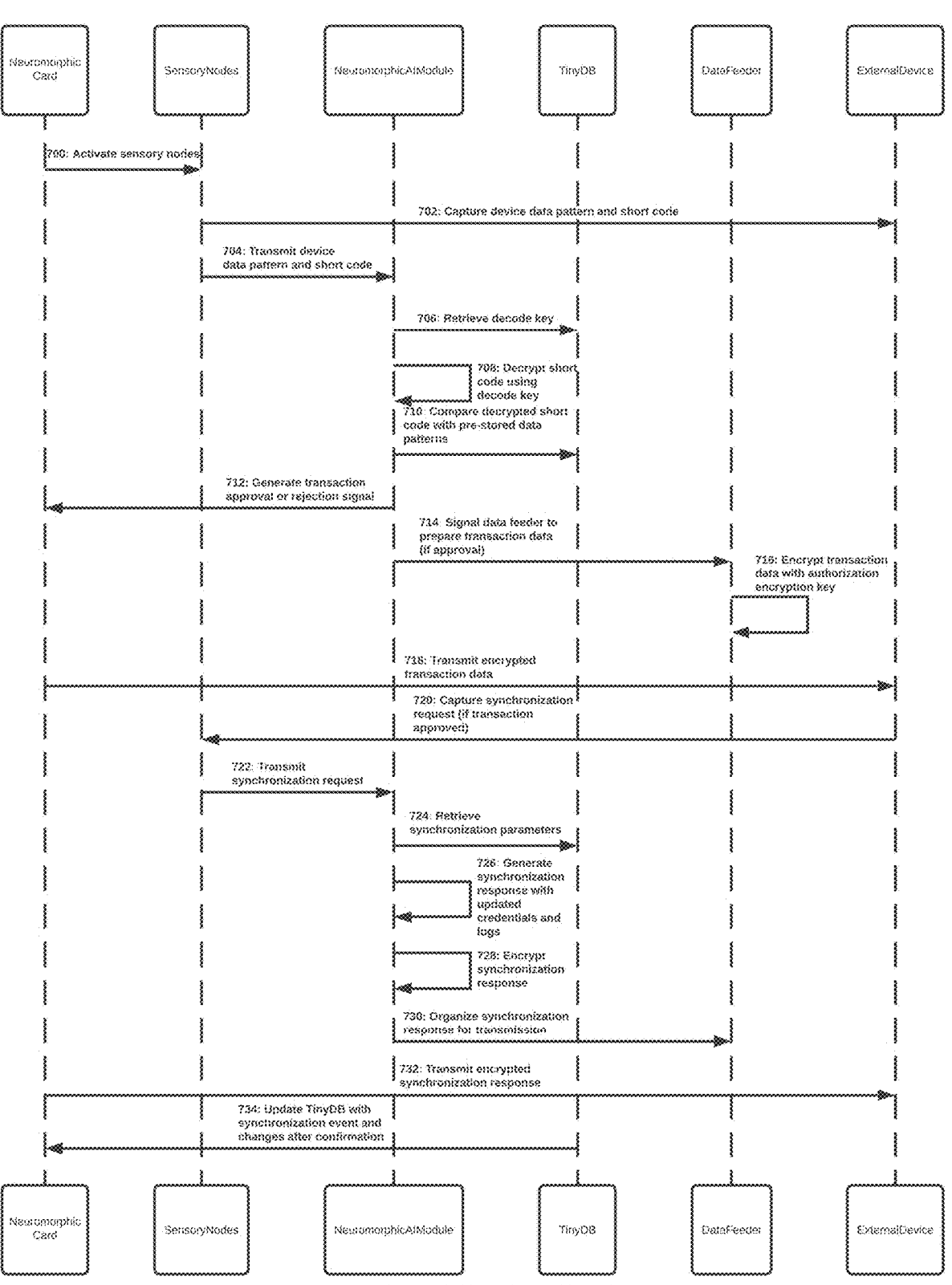
FIG. 7: Sample Sequence Diagram

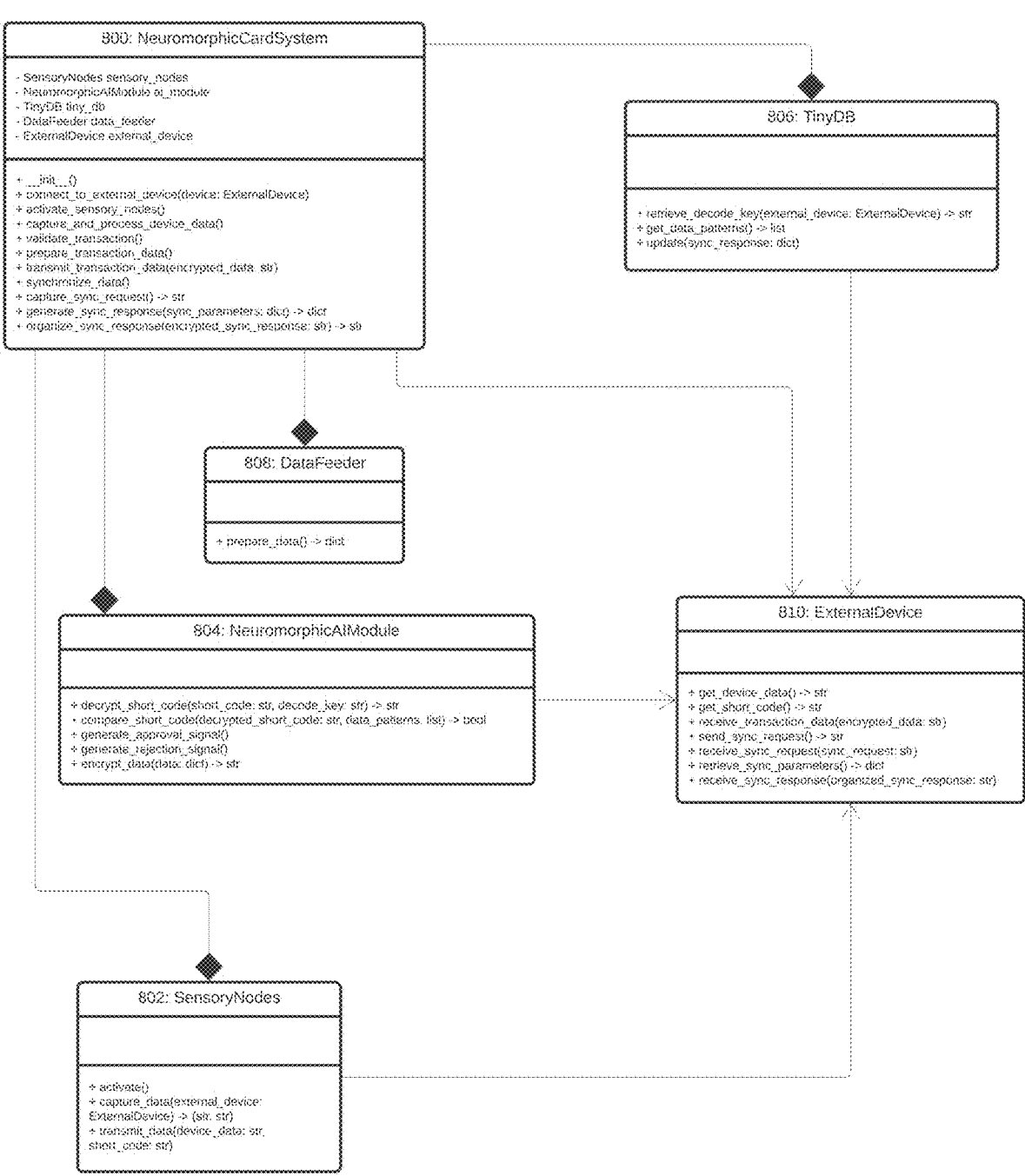
FIG. 8: Sample Class Diagram

DYNAMIC CREATION OF CONTEXTUAL PROTECTIVE SHIELD TO PROTECT CARDS USING NEUROMORPHIC TINY AI MODULE AND DYNAMIC SHORT CODE HASHING

TECHNICAL FIELD

The inventions disclosed herein pertain to the field of information security, specifically focusing on methods and systems for preventing unauthorized access to and manipulation of electronic transaction data. The technology described involves using neuromorphic AI modules and dynamic short code hashing to secure financial transactions against skimming and fraud. These measures ensure that transaction data is protected from interception and unauthorized use by validating the legitimacy of devices involved in the transaction process before any sensitive data is transmitted.

DESCRIPTION OF THE RELATED ART

The problem addressed by the invention is rooted in the increasing prevalence and sophistication of fraudulent activities targeting electronic payment systems. As financial transactions have shifted from physical currency to electronic forms, criminals have adapted by developing methods to target the vulnerabilities inherent in these systems. One of the most pervasive threats is the use of skimming devices attached to ATMs, point-of-sale (POS) terminals, and other payment interfaces. These devices are designed to capture sensitive card information, such as magnetic stripe data, EMV chip data, and even contactless transaction details, without the knowledge or consent of the cardholder. EMV, which stands for Europay, MasterCard, and Visa, refers to a global standard for credit and debit card transactions that uses embedded microprocessor chips in cards to store and protect cardholder data. These chips generate unique transaction codes for each payment, making it difficult for fraudsters to clone cards or replicate transactions. However, even with the added security of EMV chips, once this information is obtained through skimming, it can be used to create counterfeit cards or to conduct unauthorized transactions, leading to significant financial losses for both consumers and financial institutions.

Skimming devices have evolved in sophistication, becoming increasingly difficult to detect. They are often small and discreet, allowing them to be installed on legitimate payment terminals without arousing suspicion. In some cases, skimmers are integrated into overlays that fit seamlessly over the existing card readers, making them virtually indistinguishable from the genuine hardware. Additionally, criminals have begun to employ wireless technologies to transmit stolen data in real-time, further complicating efforts to detect and prevent fraud. The rapid proliferation of these devices has created a widespread and persistent problem, as traditional methods of fraud prevention, such as visual inspection and periodic maintenance of payment terminals, have proven inadequate.

Another significant issue arises from the use of fake POS terminals and ATM machines. These counterfeit devices are designed to look and function like legitimate terminals, but their sole purpose is to steal card information. In many cases, these fake terminals are installed in locations where users expect to find genuine payment interfaces, such as gas stations, retail stores, and even bank lobbies. When a cardholder uses one of these devices, their card information is immediately captured and either stored locally or transmitted to a remote server controlled by the fraudsters. The unsuspecting cardholder may not realize their information has been compromised until unauthorized transactions appear on their account, often days or weeks later.

The advent of contactless payment methods, such as near-field communication (NFC) and radio-frequency identification (RFID), has introduced new vulnerabilities. While these technologies offer convenience and speed, they also present opportunities for criminals to intercept and steal card data. In a process known as "eavesdropping," criminals use specialized equipment to capture the wireless signals emitted during a contactless transaction. This stolen data can then be used to clone cards or to make unauthorized purchases online. The ease with which contactless data can be intercepted has raised concerns about the security of these payment methods, particularly as their use becomes more widespread.

Traditional security measures, such as encryption and tokenization, have been employed to protect transaction data. However, these measures are not foolproof. Encryption keys and tokens can be compromised, particularly if they are stored on devices that fall into the wrong hands. Furthermore, many existing security protocols rely on the assumption that the payment terminal itself is secure. If a skimmer or fake terminal is in use, the entire transaction process is compromised, rendering encryption and tokenization ineffective. This fundamental vulnerability has driven the need for a more robust and proactive approach to securing electronic transactions.

The issue of counterfeit devices is further exacerbated by the global nature of electronic payments. As consumers travel and conduct transactions in different countries, they are exposed to a variety of payment terminals with varying levels of security. In some regions, outdated or poorly maintained terminals are more susceptible to tampering, increasing the risk of fraud. The lack of standardized security measures across different payment systems and geographic regions has created an environment where criminals can easily target gaps in the system. This inconsistency in security protocols has made it challenging to develop a universal solution to protect cardholders and their financial information.

Moreover, the increasing reliance on digital payments has outpaced the development of security technologies. Financial institutions and payment processors have struggled to keep up with the rapidly changing threat landscape. As a result, fraud detection systems are often reactive rather than proactive, identifying fraudulent transactions only after they have occurred. This delay in detection allows criminals to target vulnerabilities and escape detection, often making it difficult to recover stolen funds. The lack of real-time fraud prevention has contributed to the growing financial losses associated with electronic payment fraud.

The rise of mobile payment applications and the integration of digital wallets have introduced additional security concerns. These platforms store sensitive card information on mobile devices, which can be lost, stolen, or compromised by malware. While many mobile payment systems employ encryption and biometric authentication, they are still vulnerable to attacks that target the underlying software or hardware. Criminals have developed sophisticated malware that can bypass security measures and access stored card data, leading to unauthorized transactions. The increasing popularity of mobile payments has created a new frontier for fraudsters, who are constantly developing new methods to target these systems.

Another problem is the lack of consumer awareness regarding the risks associated with electronic payments. Many cardholders are unaware of the potential dangers of skimming devices, fake terminals, and contactless payment vulnerabilities. As a result, they may not take the necessary precautions to protect their card information, such as regularly checking for signs of tampering or using protective RFID sleeves for contactless cards. The lack of education and awareness has made it easier for criminals to perpetrate fraud, as many consumers do not recognize the warning signs until it is too late.

In addition to consumer ignorance, there is a lack of comprehensive training and protocols for merchants and financial institutions to detect and prevent fraud. Many merchants are unaware of the latest skimming techniques and may not be able to identify counterfeit devices. Financial institutions, while equipped with fraud detection systems, often face challenges in coordinating a response across different regions and payment networks. The fragmented nature of the payment industry has made it difficult to implement consistent and effective security measures, leaving many points of vulnerability unaddressed.

The economic impact of electronic payment fraud is substantial, with billions of dollars lost each year due to unauthorized transactions. These losses are not only borne by consumers but also by financial institutions, merchants, and payment processors. The cost of fraud extends beyond the immediate financial losses, as it also erodes consumer trust in electronic payment systems. As fraud becomes more prevalent, consumers may become more hesitant to use electronic payment methods, which could slow the adoption of new technologies and hinder the growth of the digital economy.

The legal and regulatory landscape surrounding electronic payment security is complex and varies significantly by region. In some countries, regulations mandate strict security protocols and impose heavy consequences for non-compliance. In others, the regulatory framework is less developed, allowing criminals to target weak points in the system. The lack of harmonized regulations has made it difficult to establish a global standard for electronic payment security, creating opportunities for fraudsters to operate across borders. The legal challenges associated with prosecuting electronic payment fraud further complicate efforts to combat this growing problem.

The psychological impact of electronic payment fraud on consumers should not be underestimated. Victims of fraud often experience significant stress and anxiety as they navigate the process of reporting the crime, disputing unauthorized charges, and recovering their funds. The emotional toll of fraud can lead to a loss of confidence in electronic payment systems, causing consumers to revert to less convenient and more costly payment methods, such as cash or checks. The long-term effects of fraud on consumer behavior could have lasting implications for the financial industry as a whole.

Finally, the long felt and unmet need for the invention stems from the persistent and evolving nature of electronic payment fraud. Despite advances in security technologies, criminals continue to find new ways to target vulnerabilities in the system. Existing solutions have not been able to keep pace with the rapid development of new fraud techniques, leaving consumers and financial institutions exposed to significant risks. The invention addresses this critical need by providing a proactive, intelligent solution that is capable of adapting to the ever-changing threat landscape. By offering a more secure and reliable method of protecting card information, the invention fulfills a longstanding demand for improved electronic payment security.

SUMMARY OF THE INVENTION

The technical solution provided by the invention is an innovative and comprehensive approach designed to significantly enhance the security of electronic transactions, particularly those involving smart cards. The invention leverages a combination of cutting-edge technologies, including neuromorphic computing, dynamic encryption, sensory data capture, and secure data storage, to create a robust system that not only detects but also prevents fraudulent activities in real-time.

At the core of this invention is the "Neuromorphic Tiny AI Module." Neuromorphic computing is a field of technology that emulates the architecture and function of the human mind, enabling machines to process information in ways that are more parallel and efficient compared to traditional computing systems. The Tiny AI Module embedded within the smart card is a scaled-down neuromorphic processor that performs complex data analysis and pattern recognition tasks rapidly and with minimal power consumption. Unlike conventional microprocessors, which handle tasks sequentially, the neuromorphic AI can process multiple streams of data simultaneously, making it highly effective at identifying patterns and anomalies in transaction data in real-time.

When a transaction is initiated, the sensory nodes on the smart card capture data from the external device, such as an ATM or POS terminal, and transmit this data to the Tiny AI Module. The AI Module then compares this incoming data against stored patterns, which have been learned from previous transactions. For example, it might compare the characteristics of the current transaction (such as the location, device, and transaction amount) with those of previous legitimate transactions to determine whether the current transaction is typical or suspicious. The neuromorphic AI's ability to learn from past data and adapt to new patterns allows it to continuously improve its fraud detection capabilities.

The sensory nodes embedded in the smart card are strategically placed at all points of data interaction, including the EMV chip, magnetic stripe, and contactless interfaces such as NFC and RFID. Each sensory node functions as a data capture point, collecting detailed information whenever the card interacts with an external device. For instance, when a card is inserted into an ATM, the sensory node associated with the EMV chip captures data from the ATM, such as the transaction amount, ATM identification, and the type of transaction being requested.

These sensory nodes are crucial because they ensure that the data being analyzed by the Tiny AI Module is accurate and comprehensive. The nodes capture not only the transactional data but also environmental and contextual data, such as the time and location of the transaction. This additional data helps the AI Module to make more informed decisions about whether a transaction is legitimate or potentially fraudulent. Moreover, the real-time data capture and analysis enabled by these sensory nodes significantly reduce the window of opportunity for fraudsters to tamper with or manipulate the transaction data.

The invention also incorporates a TinyDB, a specialized data storage system that uses memristor technology. Memristors are a type of non-volatile memory that retain data even when the power is off, making them particularly suited for use in smart cards, which are only powered intermittently during transactions. Memristors store information in a way that is analogous to how synapses work in the human mind, allowing for highly efficient and reliable data storage.

TinyDB stores critical data such as transaction patterns, encryption keys, and dynamic short codes generated during transactions. The memristor's ability to maintain data integrity without a continuous power supply adds an extra layer of security, as it ensures that sensitive data remains protected even if the card is lost, stolen, or physically tampered with. Additionally, memristors provide fast access times, which means that the Tiny AI Module can quickly retrieve and process the necessary data to validate a transaction, thus enhancing the overall performance of the system.

A key aspect of the invention is its use of dynamic short code hashing. This technique involves generating a unique short code for each transaction, which serves as a temporary encryption key. The short code is dynamically created based on specific attributes of the transaction, such as the time, location, and amount, ensuring that it is unique to that particular transaction. Once generated, the short code is encrypted and stored securely in TinyDB.

The dynamic nature of these short codes means that they are valid only for the duration of the transaction they are associated with. Even if a hacker intercepts the transaction data, the short code would be useless for any future transactions because it would have already expired. This mechanism significantly reduces the risk of replay attacks, where an intercepted short code might be used to authorize multiple fraudulent transactions. By ensuring that each transaction is uniquely protected, the invention provides a robust defense against various forms of electronic payment fraud.

The Data Validator plays a critical role in the transaction validation process. When a transaction is initiated, the Data Validator retrieves the encrypted short code and other relevant data from TinyDB. It then decrypts this data and compares it with the data received from the external device, such as the POS terminal or ATM. The Data Validator's primary function is to ensure that the transaction data matches the expected patterns and that the encryption has not been tampered with.

If the data passes the validation checks, the transaction is authorized, and the payment is processed. However, if there are any discrepancies—such as a mismatch between the short code in TinyDB and the one received from the external device—the transaction is immediately rejected, and no data is transmitted. This real-time validation process is crucial for preventing unauthorized transactions, as it ensures that only legitimate transactions are completed.

The Data Feeder module complements the Data Validator by organizing and formatting the validated data before it is stored in TinyDB. After the Data Validator confirms that a transaction is legitimate, the Data Feeder ensures that the data is structured in a way that facilitates quick retrieval and analysis for future transactions. This organization is vital for maintaining the system's efficiency and reliability, as it allows the Tiny AI Module and Data Validator to access and process the necessary information swiftly during each transaction.

The Data Feeder also plays a role in refining the validation criteria used by the Tiny AI Module. By analyzing the results of each transaction, the Data Feeder can help the system adapt to new types of fraud and improve its ability to detect and prevent such activities. This continuous improvement process ensures that the system remains effective even as fraud techniques evolve.

The Approval Module is the final decision-making component of the system. Once the Data Validator has verified the transaction data, the Approval Module determines whether the transaction should be completed or rejected. This module operates independently to ensure that the approval process is based solely on the integrity of the data and the security protocols in place.

By centralizing the approval process within the smart card, the invention minimizes the risk of external tampering or manipulation. The Approval Module ensures that only transactions that have been thoroughly validated and verified are authorized, providing a final safeguard against fraud.

The system also includes mechanisms for secure data synchronization between the smart card and external devices. For example, when a cardholder initiates a transaction at an ATM, the card can securely synchronize its stored data with the ATM, ensuring that both devices are operating with the most up-to-date information. This synchronization is protected by the same dynamic encryption and validation mechanisms that secure the transaction data, preventing unauthorized data from being introduced into the system.

This secure synchronization process is particularly important in environments where multiple devices interact with the card. It ensures that all parties involved in the transaction—whether it be the cardholder, the financial institution, or the merchant—are operating on a shared, secure data set. This capability is crucial for maintaining the integrity and accuracy of the transaction process.

Another critical feature of the invention is the connection key mechanism. When the smart card connects with an authorized external device, such as a POS terminal or ATM, it generates a unique connection key. This key is used to establish a secure communication channel between the card and the device, ensuring that all data exchanged during the transaction is encrypted and protected from interception.

The connection key is unique to each transaction, meaning that even if the communication is intercepted, the data cannot be reused or decoded for future transactions. This feature effectively protects against man-in-the-middle attacks, where a hacker intercepts and attempts to alter the communication between the card and the payment terminal. By securing the communication channel, the connection key mechanism adds an additional layer of protection to the transaction process.

The invention is designed with the capability for adaptive learning and continuous improvement. The Neuromorphic Tiny AI Module continuously analyzes transaction data and updates its validation criteria based on emerging fraud techniques and patterns. This adaptive learning capability is a significant advancement over traditional static systems, which rely on pre-defined rules that may become outdated as new fraud methods emerge.

By integrating machine learning within the neuromorphic computing framework, the system can identify new patterns of fraudulent activity that were not previously known. For example, if the system detects a sudden increase in transactions from a particular location or involving a specific merchant, it can flag these transactions for further review and adjust its validation criteria accordingly. This continuous improvement process ensures that the system remains effective and resilient, even as fraudsters develop new and more sophisticated methods of attack.

The invention also addresses the need for secure updates and maintenance of the smart card's security protocols. Security updates, including new data patterns, encryption keys, and validation criteria, can be delivered through a secure NFC connection with a mobile device or directly from a centralized data center. The use of memristor-based TinyDB ensures that these updates are securely stored and remain intact even if the card is subjected to tampering or power loss.

This capability allows the smart card to receive regular security updates without requiring physical replacement or manual intervention. It ensures that the card remains secure and up-to-date throughout its lifecycle, providing long-term protection against evolving threats.

Finally, the invention is designed to operate with minimal power consumption, making it ideal for use in portable and battery-powered devices such as smart cards. The efficiency of neuromorphic computing, combined with the low power requirements of memristor technology, ensures that the system can operate for extended periods without requiring frequent recharging or maintenance.

This low power requirement is particularly important for applications in remote or resource-constrained environments, where reliable power sources may not be readily available. The invention's ability to provide robust security with minimal power consumption makes it a practical and versatile solution for a wide range of electronic payment scenarios, from everyday retail transactions to high-security financial operations.

In summary, the technical solution provided by this invention is a sophisticated, multi-layered system designed to enhance the security of electronic transactions. By combining neuromorphic computing, dynamic encryption, secure data storage, and real-time validation, the system provides a robust defense against a wide range of fraudulent activities. Its ability to learn and adapt to new threats, coupled with its low power consumption and secure update mechanisms, makes it a forward-looking solution that is well-suited to the evolving landscape of electronic payments.

The technical solution described provides a robust, multi-layered defense mechanism against fraudulent activities in electronic transactions, particularly those involving smart cards. Each phase of this solution works in concert to ensure that every aspect of the transaction—from data capture and storage to validation and final approval—is meticulously secured.

Overview of Transaction Initiation and Security Protocols

When a cardholder initiates a transaction by bringing their card near a payment terminal, such as an ATM or POS machine, the first step is to authenticate the terminal itself. This is critical because fraudulent activities often involve counterfeit devices designed to mimic legitimate terminals. The card's sensory nodes immediately engage to capture the device data pattern—a unique set of characteristics associated with the terminal. This could include information such as the terminal's manufacturer details, model number, firmware version, and even its geographic location Once this data is captured, it is transmitted to the card's Neuromorphic AI Module. This module is a highly advanced processor designed to mimic the way the human mind processes information. Unlike traditional processors that handle tasks sequentially, the neuromorphic AI can process multiple streams of data simultaneously, allowing it to perform complex analyses in real-time. This capability is crucial because it enables the system to quickly compare the incoming data against pre-stored data patterns within the card.

These stored data patterns have been accumulated over time and include details from previous interactions with verified terminals. By comparing the current terminal's data with these patterns, the AI can determine whether the terminal is authentic or potentially fraudulent. This comparison is enhanced by the use of encryption keys that are unique to each vendor. These keys serve as an additional layer of security, ensuring that only transactions initiated through legitimate terminals are approved. If the AI determines that the terminal is genuine, the transaction proceeds; if it detects any inconsistencies, the transaction is immediately halted.

Technical Solution: Sample Core Components

The core components of this technical solution include neuromorphic sensory nodes, intelligent dynamic short hash keying, and the Tiny AI Module. These elements work together to create a seamless and highly secure transaction process. The sensory nodes are responsible for data capture, the Tiny AI Module handles real-time data analysis and validation, and the dynamic short hash keying ensures that transaction data is encrypted and secure at every stage.

Phase 1: Onboarding Vendor-Based Short Codes with Dynamic Hashing Key Information Before any transactions can take place, the card must be onboarded to the neuromorphic intelligent card payment platform. This process involves the downloading of a neuromorphic card app onto the cardholder's mobile device. Once installed, the app links the smart card to the authorized neuromorphic card data center. This data center acts as the central repository for all the encryption keys and dynamic short codes associated with various vendors.

During the onboarding process, the data center securely transmits these keys and codes to the mobile app, which then relays them to the smart card via a secure connection. The short codes are dynamic, meaning they are generated based on specific transaction attributes, such as time, location, and transaction amount. This ensures that each code is unique and only valid for a specific transaction, significantly enhancing security by preventing the reuse of intercepted data.

Phase II: Updating Short Code Information to the Card via Mobile Application

In the second phase, the short codes and encryption key information are updated on the card using Near Field Communication (NFC). NFC is a technology that allows for the wireless transmission of data over short distances, typically a few centimeters. This phase is initiated when the card is brought into close proximity with the mobile device running the neuromorphic card app.

As the card and mobile device establish an NFC connection, the memristor inside the card is powered up. Memristors are a form of non-volatile memory that can retain information without requiring a continuous power supply. This makes them ideal for use in smart cards, where data needs to be stored securely even when the card is not actively powered.

Once powered, the memristor stores the incoming short codes and encryption key information, which are transmitted from the mobile app. This data is then processed by the card's data validator, a component responsible for ensuring the integrity and authenticity of the incoming data. The data validator uses a connection key—shared during the NFC connection—to authenticate the data before it is accepted.

After successful validation, the data is passed to the data feeder. The data feeder formats the information and stores it in the TinyDB, a secure database within the card. The TinyDB, which is also based on memristor technology, ensures that the data is stored securely and can be accessed quickly during future transactions.

Phase III: Updating Card Data via POS Terminal

In cases where the cardholder does not have access to their mobile device, the card can still be updated using a POS terminal. Each POS terminal is equipped with a sync short code tied to its specific model and manufacturer. When the card is brought near the terminal, the sensory nodes on the card detect this sync request and initiate the update process.

The POS terminal sends its sync short code to the card, which is then transmitted to the Neuromorphic Intelligent Card Information Data Center. This data center identifies the appropriate encryption mechanism and decodes the short code. It then uses this information to identify the card, determine the version it is currently using, and retrieve the latest version of the short codes and encryption keys. This updated information is encoded with a sync-up encode key and sent back to the POS terminal, which relays it to the card.

The card's data validator then retrieves the encoded key from the TinyDB, decodes the latest sync information, and passes it to the data feeder for storage. This process ensures that the card's data is always up-to-date, even in the absence of a mobile device.

Phase IV: Transaction Phase

The fourth phase is where the actual transaction takes place. When the cardholder initiates a transaction, the sensory nodes on the card request authentication information from the payment terminal. The terminal responds by sending its current short code, which is encrypted with an authorization encryption key.

The card's data validator retrieves the decode key from the TinyDB and extracts the short code. This short code is then compared against the one stored in the TinyDB. If the codes match, the card proceeds with transferring its information to the payment terminal, allowing the transaction to be completed. This transfer is done securely, ensuring that all data is encrypted and protected from interception.

If the short codes do not match, the card immediately rejects the transaction. A flag is set to false for the payment terminal, indicating that the transaction was unsuccessful. No further data is transferred, preventing any potential fraudulent activity.

Phase V: Secure Data Synchronization

Once the transaction is approved, the system enters the secure data synchronization phase. This phase ensures that all devices involved in the transaction—the smart card, the payment terminal, and any associated financial institutions—are operating with the most current and accurate data.

During this phase, the smart card securely synchronizes its data with the payment terminal, confirming that the transaction has been completed successfully. This synchronization is protected by the same dynamic encryption mechanisms used throughout the transaction process. This step is critical for maintaining the integrity of the transaction data, ensuring that all parties involved have a consistent and accurate record of the transaction.

Phase VI: Adaptive Learning and System Improvement

The final phase of the technical solution involves adaptive learning and continuous improvement of the system. The Neuromorphic Tiny AI Module plays a central role in this phase, continuously analyzing transaction data to identify new patterns and emerging threats.

As the system processes more transactions, it accumulates data on various transaction scenarios, both legitimate and fraudulent. This data is used to refine the AI's decision-making algorithms, allowing it to better detect and respond to potential threats in the future. For example, if the AI module detects a series of transactions that deviate from normal patterns—such as multiple transactions from different locations within a short time frame—it can flag these transactions for further review.

The system's ability to learn and adapt is crucial for maintaining its effectiveness in the face of evolving fraud techniques. As fraudsters develop new methods of attack, the AI module continuously updates its patterns and validation criteria, ensuring that the system remains one step ahead.

This technical solution represents a highly advanced and comprehensive approach to securing electronic transactions. By combining neuromorphic computing, dynamic encryption, and secure data storage technologies, the system provides a robust defense against a wide range of fraudulent activities. Each phase of the process—from onboarding vendor-based short codes to final transaction approval and adaptive learning—is designed to ensure that every transaction is thoroughly vetted and secured. This multi-layered approach not only prevents unauthorized transactions but also enhances the overall security and reliability of the payment process, providing peace of mind for both cardholders and financial institutions.

In light of the foregoing, the following provides a simplified summary of the present disclosure to offer a basic understanding of its various parts. This summary is not exhaustive, nor does it limit the exemplary aspects of the inventions described herein. It is not designed to identify key or critical elements or steps of the disclosure, nor to define its scope. Rather, it is intended, as understood by a person of ordinary skill in the art, to introduce some concepts of the disclosure in a simplified form as a precursor to the more detailed description that follows. The specification throughout this application contains sufficient written descriptions of the inventions, including exemplary, non-exhaustive, and non-limiting methods and processes for making and using the inventions. These descriptions are presented in full, clear, concise, and exact terms to enable skilled artisans to make and use the inventions without undue experimentation, and they delineate the best mode contemplated for carrying out the inventions.

In some arrangements, a method for securing electronic transactions using a neuromorphic intelligent card system involves several steps. First, the method includes providing a smart card equipped with neuromorphic sensory nodes, a neuromorphic AI module, and a TinyDB, where the TinyDB serves as a memristor-based non-volatile storage device that retains pre-stored data patterns and encryption keys. When the smart card is brought into proximity with an external device, the sensory nodes are activated to capture the device's data pattern and a short code generated by the external device. This captured data is then transmitted to the neuromorphic AI module. The neuromorphic AI module retrieves a decode key from the TinyDB based on the device data pattern and uses this key to decrypt the short code. The decrypted short code is compared with the pre-stored data patterns in the TinyDB to verify the authenticity of the external device. If the decrypted short code matches the pre-stored data patterns, the neuromorphic AI module generates a transaction approval signal; otherwise, it generates a rejection signal. Upon generating the transaction approval signal, the neuromorphic AI module signals a data feeder to prepare the transaction data. The data feeder encrypts the transaction data with an authorization encryption key, and the smart card transmits the encrypted transaction data to the external device via a secure communication channel.

If the transaction is approved, a data synchronization process is activated, during which the sensory nodes capture a synchronization request from the external device. In response to this request, the neuromorphic AI module retrieves synchronization parameters from the TinyDB and generates a synchronization response that includes updated security credentials and transaction logs. This synchronization response is encrypted by the neuromorphic AI module using a synchronization encryption key. The data feeder then organizes the encrypted synchronization response for trans- mission, and the smart card sends the encrypted synchronization response to the external device via the secure communication channel. Finally, after receiving confirmation from the external device, the smart card updates the TinyDB with the synchronization event and any changes to the security credentials or transaction records.

In some arrangements, the method further involves configuring the sensory nodes to capture additional data related to the external device's operational status and geographic location as part of the device data pattern. The neuromorphic AI module is then configured to analyze this additional data captured by the sensory nodes to enhance the accuracy of the device authentication process. The TinyDB stores historical transaction data, which the neuromorphic AI module uses in conjunction with the pre-stored data patterns for more precise device authentication. Additionally, the neuromorphic AI module is configured to generate a dynamic short code that serves as a temporary encryption key for securing the communication channel during the transaction process. This dynamic short code is generated based on factors including the time of the transaction, the geographic location of the external device, and its operational status.

In some arrangements, the smart card is also configured to establish a secure connection with a mobile application, enabling the mobile application to update the TinyDB with the latest vendor-specific short codes and encryption keys. The data synchronization process includes receiving updated security credentials and encryption keys from the mobile application when available and integrating these updates into the TinyDB. The smart card's data feeder is configured to organize the transaction data and synchronization response according to a predefined format to ensure compatibility with various external devices. Moreover, the smart card logs any transaction rejections in the TinyDB, creating a traceable record of all rejected transactions for security monitoring purposes.

In some arrangements, the neuromorphic AI module is designed to perform real-time learning based on transaction data and synchronization events, continuously updating the pre-stored data patterns in the TinyDB. The sensory nodes are further configured to detect and respond to physical tampering attempts by generating a tamper-evident signal that is recorded in the TinyDB. The neuromorphic AI module adaptively adjusts the security thresholds for device authentication based on the cardholder's transaction history and behavior patterns. In the event of a transaction rejection or tamper-evident signal detection, the smart card is configured to transmit a security alert to the cardholder's mobile application. Additionally, the smart card initiates an automatic synchronization process with the mobile application after a predefined number of transactions have been completed. The TinyDB is configured to perform periodic self-checks to ensure the integrity and accuracy of the stored data, with any discrepancies being reported to the neuromorphic AI module for corrective action. Finally, the smart card operates in a low-power mode when not in use, with the memristor-based TinyDB retaining all critical data without requiring continuous power.

In some arrangements, a method for securing electronic transactions using a neuromorphic intelligent card system involves several steps. The process begins by providing a smart card equipped with neuromorphic sensory nodes, a neuromorphic AI module, and a TinyDB, which is a memristor-based non-volatile storage device configured to store pre-stored data patterns, encryption keys, historical transaction data, synchronization logs, and tamper-evident signals. When the smart card is brought into proximity with an external device, the sensory nodes are activated and configured to capture a device data pattern, a short code generated by the external device, additional data related to the external device's operational status, geographic location, and any relevant contextual information. The neuromorphic AI module then generates a dynamic short code based on factors such as the specific time of the transaction, the geographic location of the external device, the operational status of the external device, and the contextual data captured by the sensory nodes. The captured device data pattern, short code, additional data, and the dynamic short code are then transmitted to the neuromorphic AI module.

The neuromorphic AI module retrieves a decode key from the TinyDB based on the captured device data pattern and contextual information and uses this key to decrypt the short code received from the external device. The decrypted short code is then compared with the pre-stored data patterns, historical transaction data, and relevant contextual information stored in the TinyDB to determine the authenticity and legitimacy of the external device. The neuromorphic AI module also analyzes the additional data captured by the sensory nodes, including the device's operational status and geographic location, to enhance the accuracy of the device authentication process and detect any anomalies. If the decrypted short code, additional data, and contextual information match the pre-stored data patterns and historical transaction data, the neuromorphic AI module generates a transaction approval signal. Conversely, if a mismatch, anomaly, or any security threat is detected, a rejection signal is generated.

Upon generating the transaction approval signal, the neuromorphic AI module signals a data feeder to prepare the transaction data, which the data feeder then organizes and formats according to predefined secure formats. The transaction data is encrypted by the data feeder using the dynamic short code as an authorization encryption key, ensuring that the data is protected against unauthorized access or tampering. The smart card then transmits the encrypted transaction data to the external device through a secure communication channel, which is established and maintained using the dynamic short code, providing an additional layer of security during the data transmission. If any transaction rejections, anomalies, or detected security threats occur, these are logged in the TinyDB, creating a detailed and traceable record of all rejected transactions, anomalies, and potential threats for continuous security monitoring and post-transaction analysis.

If the transaction is approved, if a predefined number of transactions have been completed, or if the neuromorphic AI module detects that the smart card's data requires updating, a data synchronization process is activated. During this process, the sensory nodes capture a synchronization request from the external device or a linked mobile application. The neuromorphic AI module retrieves synchronization parameters, updated security credentials, and any pending transaction logs from the TinyDB in response to the synchronization request and compares the synchronization request and related data with the stored data in the TinyDB to ensure that the request is valid, consistent, and aligned with the card's current records and operational state. The neuromorphic AI module then generates a synchronization response that includes updated security credentials, transaction logs, and any required synchronization updates, ensuring that the smart card's data remains current and secure. This synchronization response is encrypted by the neuromorphic AI module using a synchronization encryption key that is dynamically generated based on current synchronization parameters, ensuring that the response is protected during transmission. The encrypted synchronization response is then organized and formatted by the data feeder to ensure compatibility with various external devices, including the POS terminal and any linked mobile applications.

The smart card transmits the encrypted synchronization response to the external device via the secure communication channel, ensuring that the synchronization process is completed without exposing the data to unauthorized parties. After receiving confirmation from the external device that the synchronization has been successfully completed, the smart card updates the TinyDB with the details of the synchronization event, including any changes to the security credentials, transaction records, or other critical data. Additionally, the method involves establishing a secure connection with a mobile application, where the mobile application is configured to update the TinyDB with the latest vendor-specific short codes, encryption keys, and security credentials, ensuring that the smart card remains up-to-date with the latest security protocols and vendor information.

The neuromorphic AI module performs real-time learning and adaptive analysis based on transaction data, synchronization events, and cardholder behavior patterns, continuously updating the pre-stored data patterns and security thresholds in the TinyDB to enhance the accuracy of device authentication and the detection of potential threats. The sensory nodes are configured to detect and respond to physical tampering attempts, with any detected tampering immediately logged as a tamper-evident signal in the TinyDB and flagged for further investigation by the neuromorphic AI module. The neuromorphic AI module also adaptively adjusts the security thresholds for device authentication based on the cardholder's transaction history, geographic patterns, operational environment, and behavior patterns, ensuring that the smart card provides a personalized and context-aware security response.

In the event of a transaction rejection, detected anomaly, or tamper-evident signal, the smart card transmits a security alert to the cardholder's mobile application, allowing the cardholder to take immediate action or review the security incident. The smart card may also initiate an automatic synchronization process with the mobile application or external device when a predefined number of transactions have been completed, when the smart card detects that a significant update is required, or when an anomaly in the transaction history is detected, ensuring that the card's data is consistently maintained. The TinyDB performs periodic self-checks to verify the integrity, accuracy, and consistency of the stored data, and any discrepancies or potential issues are reported to the neuromorphic AI module for immediate corrective action, maintaining the overall reliability and security of the smart card. Finally, the smart card operates in a low-power mode when not in use, with the memristor-based TinyDB retaining all critical data, security credentials, and transaction logs without requiring continuous power, allowing the smart card to conserve energy while ensuring that it remains fully functional and secure at all times.

In some arrangements, a system for securing electronic transactions using a neuromorphic intelligent card includes a smart card equipped with neuromorphic sensory nodes that are configured to capture a device data pattern, a short code generated by an external device, additional data related to the external device's operational status, geographic location, and contextual information when the smart card is brought into proximity with the external device. The smart card also contains a neuromorphic AI module that is integrated within the smart card and is configured to generate a dynamic short code based on factors such as the specific time of the transaction, the geographic location of the external device, the operational status of the external device, and the contextual information captured by the sensory nodes. A memristor-based TinyDB within the smart card serves as a non-volatile storage device, configured to store pre-stored data patterns, encryption keys, historical transaction data, synchronization logs, tamper-evident signals, and any additional data captured by the sensory nodes. The smart card also includes a data feeder that is integrated within the card, which is responsible for organizing, formatting, and encrypting transaction data and synchronization responses for secure transmission.

The neuromorphic AI module is further configured to retrieve a decode key from the TinyDB based on the device data pattern and contextual information, decrypt the short code using the decode key, and compare the decrypted short code with the pre-stored data patterns, historical transaction data, and contextual information stored in the TinyDB to determine the authenticity and legitimacy of the external device. Additionally, the neuromorphic AI module analyzes the additional data captured by the sensory nodes, including the operational status and geographic location of the external device, to enhance the accuracy of the device authentication process and detect any anomalies. Based on this analysis, the neuromorphic AI module generates a transaction approval signal if the decrypted short code, additional data, and contextual information match the pre-stored data patterns and historical transaction data; otherwise, it generates a rejection signal if a mismatch, anomaly, or security threat is detected.

Upon receiving the transaction approval signal from the neuromorphic AI module, the data feeder prepares and encrypts the transaction data using the dynamic short code as an authorization encryption key. The smart card then transmits the encrypted transaction data to the external device through a secure communication channel that is established using the dynamic short code, ensuring the security of data transmission. The smart card is also configured to log any transaction rejections, anomalies, or detected security threats in the TinyDB, creating a detailed and traceable record for security monitoring and post-transaction analysis. If the transaction is approved, if a predefined number of transactions have been completed, or if the smart card's data requires updating, the neuromorphic AI module activates a data synchronization process, during which the sensory nodes capture a synchronization request from the external device or a linked mobile application.

In response to the synchronization request, the neuromorphic AI module retrieves synchronization parameters, updated security credentials, and transaction logs from TinyDB, compares the synchronization request with the stored data in the TinyDB, and generates a synchronization response that includes updated security credentials, transaction logs, and any required synchronization updates. This synchronization response is then encrypted by the neuromorphic AI module with a synchronization encryption key that is dynamically generated based on the current synchronization parameters. The data feeder further organizes and formats the encrypted synchronization response for transmission, ensuring compatibility with various external devices and linked mobile applications. The smart card then transmits the encrypted synchronization response to the external device via the secure communication channel and updates the TinyDB with the details of the synchronization event, including any changes to security credentials or transaction records, after receiving confirmation from the external device.

The system is further configured to establish a secure connection with a mobile application, allowing the mobile application to update the TinyDB with the latest vendor-specific short codes, encryption keys, and security credentials, ensuring that the smart card remains up-to-date with the latest security protocols and vendor information. The neuromorphic AI module performs real-time learning and adaptive analysis based on transaction data, synchronization events, and cardholder behavior patterns, continuously updating the pre-stored data patterns and security thresholds in the TinyDB to enhance the accuracy of device authentication and detect potential threats. The sensory nodes are also configured to detect physical tampering attempts and respond by generating a tamper-evident signal, which is logged in the TinyDB and flagged for further investigation by the neuromorphic AI module. The neuromorphic AI module is further configured to adaptively adjust security thresholds for device authentication based on the cardholder's transaction history, geographic patterns, operational environment, and behavior patterns, providing a personalized and context-aware security response.

In the event of a transaction rejection, detected anomaly, or tamper-evident signal, the smart card is configured to transmit a security alert to the cardholder's mobile application, enabling the cardholder to take immediate action or review the security incident. The smart card can also initiate an automatic synchronization process with the mobile application or external device when a predefined number of transactions have been completed, when a significant update is required, or when an anomaly in the transaction history is detected, ensuring consistent data maintenance. The TinyDB performs periodic self-checks to verify the integrity, accuracy, and consistency of the stored data, with any discrepancies reported to the neuromorphic AI module for corrective action to maintain the reliability and security of the smart card. Additionally, the smart card operates in a low-power mode when not in use, with the memristor-based TinyDB retaining all critical data, security credentials, and transaction logs without requiring continuous power, ensuring that the smart card conserves energy while remaining fully functional and secure.

The system is also designed such that the neuromorphic AI module dynamically adapts and selects encryption algorithms for both the authorization encryption key and the synchronization encryption key based on a comprehensive, real-time analysis of multiple transaction environment variables. These variables include, but are not limited to, the security level and firmware version of the external device, the geographic location of the transaction, the frequency and timing of transactions at the specific location, historical data of transaction patterns, and any detected anomalies or patterns of attempted security breaches. The neuromorphic AI module assesses the risk profile of each transaction and selects the most appropriate encryption algorithm from a plurality of available encryption algorithms, balancing between maximizing security and maintaining optimal processing efficiency. The system further includes a continuous monitoring mechanism within the neuromorphic AI module that updates and refines the encryption algorithm selection criteria stored in the TinyDB based on evolving transaction environments and emerging security threats. The smart card is additionally configured to store these algorithm selections and adjustments in the TinyDB for reference and application in future transactions and synchronization events, ensuring that the card adapts to new threats and environmental changes over time while maintaining a high level of security and operational efficiency.

The following description and claims, in conjunction with the drawings—all integral parts of this specification—will clarify various features and characteristics of the current technology. Like reference numerals in the figures correspond to similar parts, enhancing understanding of the technology's methods of operation and the functions of related structural elements, as well as the synergies and economies of their combinations. Some of the processes or procedures described here may be implemented, in whole or in part, as computer-executable instructions recorded on computer-readable media, configured as computer modules, or in other computer constructs. These steps and functionalities may be executed on a single device or distributed across multiple devices interconnected with one another. However, it is important to acknowledge that the drawings primarily serve for descriptive and illustrative purposes and are not intended to delineate the limits of the invention. Unless contextually evident, the singular forms of "a," "an," and "the" used throughout the specification and claims should be interpreted to include their plural counterparts.

BRIEF DESCRIPTION OF DRAWINGS

FIG. 1 depicts a sample system/process to dynamically create contextual protective shield to protect cards using Neuromorphic Tiny AI Module and Dynamic Short Code Hashing. This figure outlines the step-by-step process from initiating the sensory nodes to the completion or rejection of the transaction.

FIG. 2 depicts a sample entity relationship diagram for techniques to dynamically create contextual protective shield to protect cards using Neuromorphic Tiny AI Module and Dynamic Short Code Hashing. This diagram showcases the relationships between various components, such as Sensory Nodes, TinyDB, Data Validator, and the Neuromorphic Tiny AI Module.

FIG. 3 depicts sample systems and components for neuromorphic card to dynamically create contextual protective shield to protect cards using Tiny AI Module and Dynamic Short Code Hashing. The figure illustrates the interaction between different components, including the Tiny AI Engine, Neuro Sensory Nodes, and various payment terminals.

FIG. 4 depicts a sample system process for updating data to card process flow. It shows how data synchronization and updates occur between the card, mobile device, and data center using dynamic short hash keys.

FIG. 5 depicts a sample system process for data sync up with ATM and POS flow. This figure explains how the sensory nodes and data center work together to ensure that the card's data is synchronized and up-to-date with the latest versions.

FIG. 6 depicts a sample system process for transaction validation flow. The diagram illustrates the communication between the sensory nodes, data validator, and data center during the validation of a transaction.

FIG. 7 depicts a sample sequence diagram. This figure outlines the step-by-step sequence of actions taken by the Neuromorphic Card and associated components, from activating sensory nodes to updating TinyDB with synchronization events.

FIG. 8 illustrates a sample class diagram for implementing one or more aspects of the inventions disclosed herein.

DETAILED DESCRIPTION

The inventions introduce a highly sophisticated system designed to secure electronic transactions, particularly those involving smart cards, through a combination of neuromorphic computing, dynamic encryption, and advanced data storage techniques. This system addresses the growing threat of fraud in electronic payments by ensuring that every aspect of a transaction, from initiation to completion, is thoroughly vetted and protected. At its core, the invention leverages neuromorphic sensory nodes embedded within the smart card to capture and analyze data in real-time. These sensory nodes play a critical role in the system's security architecture, as they are responsible for gathering detailed information about the device or terminal that the card interacts with, such as an ATM or POS machine.

The neuromorphic AI module embedded within the smart card is a key component of the invention. This module is designed to process the data captured by the sensory nodes using principles of neuromorphic computing, which mimic the way the human mind processes information. Unlike traditional computing systems that handle tasks sequentially, the neuromorphic AI can process multiple streams of data simultaneously, allowing it to perform complex analyses in real-time. This capability is particularly important in the context of transaction security, as it enables the system to quickly compare the incoming data with pre-stored patterns to determine whether the transaction is legitimate or potentially fraudulent.

One of the most innovative aspects of the invention is its use of dynamic short codes and encryption keys to secure transaction data. Each time a transaction is initiated, the system generates a unique short code based on specific attributes of the transaction, such as the time, location, and transaction amount. This short code serves as a temporary encryption key that is used to protect the transaction data as it moves through the system. The dynamic nature of these short codes ensures that each transaction is uniquely secured, making it extremely difficult for fraudsters to intercept and reuse the data.

The system also incorporates a specialized data storage technology known as memristors. Memristors are a type of non-volatile memory that can retain data even when the power is off, making them ideal for securely storing sensitive information such as encryption keys and transaction patterns. The invention uses memristor-based storage, referred to as TinyDB, to store critical transaction data within the smart card. This ensures that the data is securely stored and can be quickly accessed during the transaction process.

To ensure that the card's data is always up-to-date, the invention includes a mechanism for updating the short codes and encryption keys via a mobile application. This application, which is linked to an authorized neuromorphic card data center, can securely transmit updated information to the card using Near Field Communication (NFC). When the card is brought near the mobile device, the NFC signal powers the memristor inside the card, allowing it to receive and store the updated data. This process ensures that the card is always equipped with the latest security information, even if it is not connected to a power source.

In cases where the cardholder does not have access to their mobile device, the invention provides an alternative method for updating the card's data using a POS terminal.

Each POS terminal is equipped with a sync short code that is tied to its specific model and manufacturer. When the card is brought near the terminal, the sensory nodes detect this sync request and initiate the update process. The POS terminal transmits its sync short code to the card, which then communicates with the neuromorphic card data center to retrieve the latest version information and encryption keys.

Once the transaction process is initiated, the card's sensory nodes request authentication information from the payment terminal. The terminal responds by sending its current short code, which is encrypted with an authorization encryption key. The card's data validator retrieves the corresponding decode key from TinyDB and compares the received short code with the one stored in the database. If the codes match, the transaction is approved, and the card proceeds with transferring its information to the terminal. This process ensures that only legitimate transactions are completed, while any discrepancies result in the transaction being immediately halted.

The invention also includes a secure data synchronization phase that occurs after the transaction is approved. During this phase, the smart card synchronizes its data with the payment terminal, ensuring that both devices are operating with the most current and accurate information. This synchronization is protected by the same dynamic encryption mechanisms used throughout the transaction process, preventing any unauthorized data from being introduced into the system.

Another key aspect of the invention is its ability to learn and adapt to new fraud techniques over time. The neuromorphic AI module continuously analyzes transaction data to identify patterns and detect anomalies that may indicate fraudulent activity. As the system processes more transactions, it refines its algorithms and updates its validation criteria, ensuring that it remains effective in the face of evolving threats. This adaptive learning capability is crucial for maintaining the long-term effectiveness of the system, as it allows the invention to stay ahead of potential fraudsters.

The invention is designed to be compatible with existing payment infrastructure, making it easy to integrate into current systems without requiring significant modifications. The neuromorphic sensory nodes and AI module are engineered to work seamlessly with standard ATMs, POS terminals, and contactless payment systems. This compatibility is essential for widespread adoption, as it allows financial institutions and merchants to implement the security features of the invention without incurring prohibitive costs or operational disruptions.

The invention also addresses the need for minimal power consumption, making it ideal for use in portable and battery-powered devices such as smart cards. The efficiency of neuromorphic computing, combined with the low power requirements of memristor technology, ensures that the system can operate for extended periods without requiring frequent recharging or maintenance. This is particularly important in remote or resource-constrained environments, where reliable power sources may not be readily available.

The invention's multi-phase approach to transaction security provides a comprehensive solution to the growing problem of electronic payment fraud. Each phase of the process is designed to address specific vulnerabilities in the transaction process, ensuring that every step, from data capture to final approval, is secure and reliable. By combining advanced technologies such as neuromorphic computing, dynamic encryption, and secure data storage, the invention provides a robust defense against a wide range of fraudulent activities.

Overall, the invention offers a highly effective and adaptable solution for securing electronic transactions. Its use of neuromorphic computing and dynamic short codes ensures that each transaction is uniquely protected, while its memristor-based storage provides a secure and reliable means of storing sensitive information. The invention's ability to learn and adapt to new fraud techniques ensures that it remains effective in the face of evolving threats, making it a valuable tool for financial institutions and consumers alike.

The invention also emphasizes ease of use and compatibility with existing systems, making it accessible to a wide range of users. Its low power consumption and ability to operate in a variety of environments further enhance its practicality and versatility. By providing a comprehensive, multi-layered approach to transaction security, the invention addresses the critical need for more robust defenses against electronic payment fraud, offering a reliable solution that can be widely adopted across the industry.

The description of various example embodiments herein is intended to achieve the goals previously outlined, referencing the illustrations included in this disclosure. These illustrations depict multiple systems and methods for implementing the disclosed information. It should be recognized that alternative implementations are possible, and modifications to both structure and functionality may be made. The description details various connections between elements, which should be interpreted broadly. Unless explicitly stated otherwise, these connections can be either direct or indirect and may be established through either wired or wireless methods. This document does not aim to restrict the nature of these connections.

Terms such as "computers," "machines," and similar phrases are used interchangeably based on the context to denote devices that may be general-purpose or specialized for specific functions, whether virtual or physical, and capable of network connectivity. This encompasses all pertinent hardware, software, and components known to those skilled in the field. Such devices might feature specialized circuits like application-specific integrated circuits (ASICs), microprocessors, cores, or other processing units for executing, accessing, controlling, or implementing various types of software, instructions, data, modules, processes, or routines. The employment of these terms within this document is not intended to restrict or exclusively refer to any specific type of electronic devices or components, and should be interpreted broadly by those with relevant expertise. For conciseness and assuming familiarity, detailed descriptions of computer/software components and machines are omitted.

Software, executable code, data, modules, procedures, and similar entities may reside on tangible, physical computer-readable storage devices. This includes a range from local memory to network-attached storage, and various other accessible memory types, whether removable, remote, cloud-based, or accessible through other means. These elements can be stored in both volatile and non-volatile memory forms and may operate under different conditions such as autonomously, on-demand, as per a preset schedule, spontaneously, proactively, or in response to certain triggers. They may be consolidated or distributed across multiple computers or devices, integrating their memory and other components. These elements can also be located or dispersed across network-accessible storage systems, within distributed databases, big data infrastructures, blockchains, or distributed ledger technologies, whether collectively or in distributed configurations.

The term "networks" and similar references encompass a wide array of communication systems, including local area networks (LANs), wide area networks (WANs), the Internet, cloud-based networks, and both wired and wireless configurations. This category also covers specialized networks such as digital subscriber line (DSL) networks, frame relay networks, asynchronous transfer mode (ATM) networks, and virtual private networks (VPN), which may be interconnected in various configurations. Networks are equipped with specific interfaces to facilitate diverse types of communications—internal, external, and administrative—and have the ability to assign virtual IP addresses (VIPs) as needed. Network architecture involves a suite of hardware and software components, including but not limited to access points, network adapters, buses, both wired and wireless ethernet adapters, firewalls, hubs, modems, routers, and switches, which may be situated within the network, on its edge, or externally. Software and executable instructions operate on these components to facilitate network functions. Moreover, networks support HTTPS and numerous other communication protocols, enabling them to handle packet-based data transmission and communications effectively.

As used herein, Generative Artificial Intelligence (AI) or the like refers to AI techniques that learn from a representation of training data and use it to generate new content similar to or inspired by existing data. Generated content may include human-like outputs such as natural language text, source code, images/videos, and audio samples. Generative AI solutions typically leverage open-source or vendor sourced (proprietary) models, and can be provisioned in many ways, including, but not limited to, Application Program Interfaces (APIs), websites, search engines, and chatbots. Most often, Generative AI solutions are powered by Large Language Models (LLMs) which were pre-trained on large datasets using deep learning with over 500 million parameters and reinforcement learning methods. Any usage of Generative AI and LLMs is preferably governed by an Enterprise AI Policy and an Enterprise Model Risk Policy.

Generative artificial intelligence models have been evolving rapidly, with various organizations developing their own versions. Sample generative AI models that can be used under various aspects of this disclosure include but are not limited to: (1) OpenAI GPT Models: (a) GPT-3: Known for its ability to generate human-like text, it's widely used in applications ranging from writing assistance to conversation. (b) GPT-4: An advanced version of the GPT series with improved language understanding and generation capabilities. (2) Meta (formerly Facebook) AI Models-Meta LLAMA (Language Model Meta AI): Designed to understand and generate human language, with a focus on diverse applications and efficiency. (3) Google AI Models: (a) BERT (Bidirectional Encoder Representations from Transformers): Primarily used for understanding the context of words in search queries. (b) T5 (Text-to-Text Transfer Transformer): A versatile model that converts all language problems into a text-to-text format. (4) DeepMind AI Models: (a) GPT-3.5: A model similar to GPT-3, but with further refinements and improvements. (b) AlphaFold: A specialized model for predicting protein structures, significant in biology and medicine. (5) NVIDIA AI Models—Megatron: A large, powerful transformer model designed for natural language processing tasks. (6) IBM AI Models-Watson: Known for its application in various fields for processing and analyzing large amounts of natural language data. (7) XLNet: An extension of the Transformer model, outperforming BERT in several benchmarks. (8) GROVER: Designed for detecting and generating news articles, useful in understanding media-related content. These models represent a range of applications and capabilities in generative AI. One or more of the foregoing may be used herein as desired. All are considered within the sphere and scope of this disclosure.

Generative AI and LLMs can be used in various parts of this disclosure performing one or more various tasks, as desired, including: (1) Natural Language Processing (NLP): This involves understanding, interpreting, and generating human language. (2) Data Analysis and Insight Generation: Including trend analysis, pattern recognition, and generating predictions and forecasts based on historical data. (3) Information Retrieval and Storage: Efficiently managing and accessing large data sets. (4) Software Development Lifecycle: Encompassing programming, application development, deployment, along with code testing and debugging. (5) Real-Time Processing: Handling tasks that require immediate processing and response. (6) Context-Sensitive Translations and Analysis: Providing accurate translations and analyses that consider the context of the situation. (7) Complex Query Handling: Utilizing chatbots and other tools to respond to intricate queries. (8) Data Management: Processing, searching, retrieving, and using large quantities of information effectively. (9) Data Classification: Categorizing and classifying data for better organization and analysis. (10) Feedback Learning: Processes whereby AI/LLMs improve performance based on feedback it receives. (Key aspects can include, for example, human feedback, Reinforcement Learning, interactive learning, iterative improvement, adaptation, etc.). (11) Context Determination: Identifying the relevant context in various scenarios. (12) Writing Assistance: Offering help in composing human-like text for various forms of writing. (13) Language Analysis: Analyzing language structures and semantics. (14) Comprehensive Search Capabilities: Performing detailed and extensive searches across vast data sets. (15) Question Answering: Providing accurate answers to user queries. (16) Sentiment Analysis: Analyzing and interpreting emotions or opinions from text. (17) Decision-Making Support: Providing insights that aid in making informed decisions. (18) Information Summarization: Condensing information into concise summaries. (19) Creative Content Generation: Producing original and imaginative content. (20) Language Translation: Converting text or speech from one language to another.

In FIG. 1, the system for dynamically creating a contextual protective shield to secure card transactions begins its operation at step 100, where the entire process is initiated. This marks the start of a meticulously designed sequence aimed at ensuring the security and integrity of every transaction. The initiation phase prepares all components, including the sensory nodes and processing modules, for the task of safeguarding the transaction data against potential threats.

At step 102, the system activates the sensory nodes embedded within the card. These sensory nodes are highly sophisticated components designed to interact with external devices such as point-of-sale (POS) machines, automated teller machines (ATMs), and RFID readers. When the card is brought into proximity with one of these devices, the sensory nodes immediately begin capturing a wide array of data. This data includes not only the specific transaction details but also crucial contextual information, such as the exact time and location of the transaction, the type of device being used, its manufacturer, and its firmware version. This comprehensive data capture is vital because it provides a detailed snapshot of the transaction environment, which is essential for the subsequent validation and security checks.

At step 104, the system proceeds to gather detailed data from the card's key components. These components include the EMV chip, Near Field Communication (NFC) interface, magnetic stripe, and Radio Frequency Identification (RFID) tag. Each component plays a unique role in the transaction process. The EMV chip, known for its secure processing capabilities, generates a unique transaction code for each interaction, which is captured and analyzed by the system. The NFC interface facilitates contactless communication with the external device, allowing for swift data exchange, while the magnetic stripe and RFID tag provide additional data points that are critical for the thorough validation of the transaction. The data gathered from these components is not just transactional but also includes any environmental and operational specifics that could influence the legitimacy of the transaction.

Once the data is collected, step 106 involves transmitting this comprehensive dataset to the Neuromorphic Tiny AI Module, which is the central processing unit within the card. The Neuromorphic Tiny AI Module is a highly advanced system designed to process vast amounts of data simultaneously, employing parallel processing techniques that significantly enhance the speed and efficiency of data analysis. This module is responsible for scrutinizing the incoming data to detect any anomalies or patterns that could indicate a potential security threat. Unlike traditional processors that might handle data sequentially, this module can analyze multiple streams of data in real-time, allowing for immediate detection of irregularities.

At step 110, the Neuromorphic Tiny AI Module processes the received data by applying complex algorithms that are specifically designed to recognize patterns and detect any deviations from normal transactional behavior. This processing step is critical because it allows the system to make real-time decisions about the legitimacy of the transaction. The module compares the incoming data against a vast repository of pre-stored patterns and historical transaction data that has been accumulated from previous legitimate transactions. By analyzing this data, the module can determine whether the current transaction is consistent with known legitimate behavior or if it exhibits characteristics that are typical of fraudulent activity. This pattern recognition capability is what enables the system to effectively differentiate between legitimate transactions and potential fraud.

Following the processing and analysis of the data, the Neuromorphic Tiny AI Module connects to the TinyDB and Data Validator at step 114. The TinyDB is a specialized data storage system that uses cutting-edge memristor technology, which is a type of non-volatile memory that retains information even in the absence of power. This capability is essential for the secure storage of sensitive data such as transaction patterns, encryption keys, and other critical information. Step 116 highlights the role of the TinyDB in storing transaction-related data. The TinyDB ensures that all data, including the recognized patterns and encryption keys used during the transaction, is securely stored and readily accessible for future validation checks. This stored data forms the backbone of the system's ability to validate transactions accurately and quickly.

In step 118, the TinyDB securely stores transaction patterns and encryption keys, which are vital for the ongoing validation processes. These patterns and keys are the reference points against which all incoming data is compared. The ability of the TinyDB to store this data securely and to make it accessible in real-time ensures that the system can continuously protect against fraud and unauthorized access.

The design of the TinyDB allows for rapid data retrieval and storage, as described in step 120. This ensures that both the Neuromorphic Tiny AI Module and the Data Validator can access the necessary information without delay, enabling them to make real-time decisions during the transaction process. The memristor technology underlying the TinyDB, detailed in step 122, further enhances the security and reliability of the data storage by ensuring that all information remains intact even when the card is not actively powered. This feature is particularly important for maintaining the integrity of the stored data, which includes sensitive information such as encryption keys and transaction histories, protecting them from unauthorized access or tampering.

At step 126, the Data Validator plays a crucial role in the transaction process by verifying the authenticity of the incoming data. The Data Validator cross-references the data received from the transaction against the pre-stored patterns and encryption keys in the TinyDB. This cross-referencing process involves a meticulous comparison of the dynamic short codes and other transaction-specific data against the stored records. The Data Validator's primary function is to ensure that the transaction data has not been altered or corrupted during transmission. If the Data Validator confirms that the data is authentic and matches the expected patterns, the transaction is allowed to proceed. If there is any discrepancy, however, the transaction is immediately rejected, as indicated in step 130, ensuring that no fraudulent transactions are completed.

Upon successful validation by the Data Validator, the process advances to step 132, where the Data Feeder organizes and formats the validated data. The Data Feeder plays a critical role in ensuring that the data is properly structured for efficient storage in the TinyDB and quick retrieval in future transactions. This step is essential for maintaining the overall efficiency of the system, as well-organized data can be accessed and processed swiftly during subsequent transactions. The Data Feeder also ensures that the validated data is stored in a manner that facilitates ongoing analysis and validation by the Neuromorphic Tiny AI Module and the Data Validator.

After the Data Feeder has organized and formatted the data, the system engages the Approval Module at step 136. The Approval Module is the final decision-making component within the card, responsible for determining whether the transaction should be completed or rejected based on the validated data. This module operates independently from the other components to ensure that the final decision is made solely based on the integrity of the data and the security protocols that have been applied throughout the transaction. By centralizing the approval process within the card, the system minimizes the risk of external interference or manipulation, ensuring that only transactions that have passed all validation checks are authorized.

Finally, the transaction either reaches completion or is rejected, as indicated in step 138, bringing the entire process to an end at step 140. The system's comprehensive approach to transaction security ensures that each transaction is thoroughly vetted from start to finish. This sophisticated integration of neuromorphic AI, dynamic short code hashing, and memristor-based storage within the card infrastructure provides a robust and adaptive defense against modern electronic payment fraud. By continuously learning from each transaction and adapting to new threats, the system remains highly effective in securing sensitive financial transactions against unauthorized access and manipulation, making it an invaluable tool in the fight against electronic payment fraud.

FIG. 2 provides a comprehensive depiction of the intricate entity relationship diagram that underpins the system designed to dynamically create a contextual protective shield for card transactions using a Neuromorphic Tiny AI Module and dynamic short code hashing. This figure intricately maps out the interactions between various components, each of which is integral to ensuring the security and integrity of the transaction process.

At the core of FIG. 2 lies the Neuromorphic Tiny AI Module, identified by the label 210. This module serves as the central processing unit within the system, tasked with the critical responsibilities of analyzing data, identifying transaction patterns, and detecting potential anomalies that could signal fraudulent activity. The Neuromorphic Tiny AI Module is connected to multiple other components, each contributing to the overall functionality and security of the system in a unique way.

One of the key components connected to the Neuromorphic Tiny AI Module is the network of Sensory Nodes, labeled as 200. These Sensory Nodes are designed to capture data from a variety of external devices, such as point-of-sale (POS) terminals, automated teller machines (ATMs), and RFID readers. The Sensory Nodes are strategically positioned within the card to interface with several critical elements, including the EMV Chip, the Near Field Communication (NFC) interface, the Magnetic Stripe, and the Radio Frequency Identification (RFID) tag. Each of these elements is represented in FIG. 2, highlighting their specific roles in the data capture process.

The EMV Chip, designated by the label 202, plays a pivotal role in the transaction process by generating a unique transaction code each time the card is used. This transaction code is a fundamental component in the security architecture, as it is captured by the Sensory Nodes and subsequently analyzed by the Neuromorphic Tiny AI Module to determine the legitimacy of the transaction. The NFC interface, identified as 204, facilitates wireless communication between the card and external devices, enabling swift and secure contactless transactions. This interface is particularly important for modern payment systems, where the convenience of contactless transactions is coupled with the need for robust security measures. The Magnetic Stripe, labeled as 206, and the RFID tag, identified as 208, serve as additional sources of data. The Magnetic Stripe, although an older technology, still contains vital information that is captured and analyzed during the transaction. The RFID tag provides yet another layer of data, particularly in scenarios involving proximity-based transactions, where the card does not need to physically touch the reader.

As the Sensory Nodes capture this diverse set of data from the EMV Chip, NFC interface, Magnetic Stripe, and RFID tag, they transmit it to the Neuromorphic Tiny AI Module for processing. The Neuromorphic Tiny AI Module, with its advanced computational capabilities, processes this data by comparing it against a vast repository of pre-stored patterns and historical transaction data. This comparison is essential for the system's ability to detect and prevent fraud. The module is designed to recognize even the slightest deviations from normal transactional behavior, which could indicate an attempt at fraud. By analyzing the data in real-time, the Neuromorphic Tiny AI Module can make immediate decisions about the validity of the transaction, ensuring that only legitimate transactions are allowed to proceed.

Another critical component within this system is the TinyDB, labeled as 212. The TinyDB is a specialized data storage system that utilizes memristor technology, a type of non-volatile memory that is capable of retaining information even in the absence of power. This characteristic is crucial for the secure storage of sensitive information such as transaction patterns, encryption keys, and other critical data that must be preserved over time. The TinyDB's connection to the Neuromorphic Tiny AI Module is vital for the seamless operation of the system, as it allows the AI Module to access the data it needs to validate transactions quickly and efficiently.

The Memristor, labeled as 214, is the underlying technology that powers the TinyDB. As a form of non-volatile memory, the Memristor ensures that all data stored within the TinyDB is retained securely, even when the card is not actively powered. This feature is particularly important for maintaining the integrity and availability of critical data, such as encryption keys and transaction histories, which must be protected from unauthorized access or tampering. The Memristor's ability to store data without the need for continuous power makes it an ideal solution for the secure, long-term storage of sensitive information within the card.

Connected to the Neuromorphic Tiny AI Module and the TinyDB is the Data Validator, identified by the label 216. The Data Validator plays a critical role in the transaction process by verifying the authenticity of the data captured during the transaction. It does this by cross-referencing the incoming data against the pre-stored patterns and encryption keys in the TinyDB. The Data Validator's primary function is to ensure that the transaction data has not been altered or corrupted during transmission and that it matches the expected patterns of legitimate transactions. This cross-referencing process is meticulous, involving a thorough comparison of the dynamic short codes and other transaction-specific data against the stored records in the TinyDB. If the Data Validator confirms that the data is authentic and matches the expected patterns, it signals that the transaction can proceed. If any discrepancies are detected, the transaction is immediately rejected, ensuring that fraudulent transactions are not processed.

Once the Data Validator has confirmed the authenticity of the transaction data, the validated data is handed off to the Data Feeder, labeled as 218. The Data Feeder's role is to organize and format the validated data for efficient storage in the TinyDB. This step is crucial for maintaining the overall efficiency and integrity of the system, as well-organized data can be quickly retrieved and processed in future transactions. The Data Feeder ensures that all relevant data is stored in a manner that facilitates rapid access and analysis by the Neuromorphic Tiny AI Module and the Data Validator in subsequent transactions. By structuring the data in a logical and accessible way, the Data Feeder helps to optimize the system's performance and reliability.

The final component in FIG. 2 is the Approval Module, identified by the label 220. The Approval Module is connected to both the Neuromorphic Tiny AI Module and the Data Validator, and it serves as the final authority in the transaction process. Its primary function is to make the final decision on whether the transaction should be approved or rejected based on the validated data. The Approval Module operates independently to ensure that its decision is based solely on the integrity of the data and the security protocols that have been applied throughout the transaction. By centralizing the approval process within the card, the system reduces the risk of external interference or manipulation, ensuring that only transactions that have passed all validation checks are authorized.

Overall, FIG. 2 presents a detailed entity-relationship diagram for a highly integrated system where each component plays a specific role in securing card transactions. The connections between the Neuromorphic Tiny AI Module, Sensory Nodes, TinyDB, Memristor, Data Validator, Data Feeder, and Approval Module create a robust and adaptive framework that protects against unauthorized access and fraud. The use of advanced technologies, such as memristor-based storage and neuromorphic computing, ensures that the system can process, validate, and store transaction data efficiently and securely, providing a powerful defense against modern electronic payment threats. The system's ability to analyze data in real-time, cross-reference it against stored patterns, and make immediate decisions about the validity of transactions makes it an essential tool in the ongoing effort to protect financial transactions from fraud and other forms of electronic crime.

FIG. 3 provides an intricate and expansive view of a highly advanced system designed to create a contextual protective shield for securing card transactions. This system employs the Neuromorphic Tiny AI Module and dynamic short code hashing, integrating multiple sophisticated components to ensure the security, accuracy, and integrity of every transaction. The figure meticulously outlines the interactions between these components, each playing a vital role in a multi-layered defense mechanism that operates seamlessly across various payment environments.

At the core of the system lies the Neuromorphic Card, labeled as 300, a cutting-edge piece of technology equipped with the capability to interact with a wide range of external devices. These devices include point-of-sale (POS) machines, denoted by labels 302A through 302N. These POS machines represent the diverse landscape of payment technologies that the Neuromorphic Card may encounter in real-world scenarios. For instance, a retail store might use an EMV chip reader (identified as 304) to process credit and debit card payments. EMV chip technology is known for its enhanced security features, as it generates a unique transaction code for each payment, making it highly resistant to cloning and fraud. In another example, a public transportation system might employ an NFC reader (labeled as 306) to allow commuters to make quick, contactless payments by simply tapping their card on the reader. This method of payment is particularly valued for its speed and convenience, especially in high-traffic environments.

Embedded within the Neuromorphic Card are one or more Neuro Sensory Nodes, identified by labels 310A through 310N. Neuro Sensory Nodes are advanced data-capturing components integrated into systems like the Neuromorphic Card to interact with various external devices and environments, gathering crucial information that is essential for ensuring the security and integrity of transactions. These nodes are designed to function as the card's sensory organs, analogous to how biological sensors work in living organisms, where they continuously monitor, capture, and transmit data for processing and analysis.

The primary function of Neuro Sensory Nodes is to interface with the external environment, collecting a broad spectrum of data during each transaction. This data includes not only direct transactional details, such as the amount, location, and time of the transaction but also contextual information, such as the type of device used, its operational status, the environmental conditions, and other factors that might influence the security of the transaction. By capturing this comprehensive set of data, the Neuro Sensory Nodes enable the system to build a complete and accurate picture of the transaction environment, which is critical for subsequent validation and security checks.

Set forth below are examples of how the Neuro Sensory Nodes can operate.

a. Data Collection: Neuro Sensory Nodes are strategically embedded within the Neuromorphic Card to interface with various components of the card and external devices like POS terminals, ATMs, and RFID readers. For instance, when the card is used at a retail checkout equipped with an EMV chip reader, the Neuro Sensory Nodes would capture data from the EMV chip, including the unique transaction code generated by the chip, the merchant's identification, the transaction amount, and the geographical location of the transaction. If the card is used in a contactless payment scenario via NFC (Near Field Communication), the sensory nodes would capture the wireless communication details between the card and the POS terminal, such as the signal strength, data exchange patterns, and any anomalies that might indicate a security risk.

b. Contextual Awareness: One of the most significant aspects of Neuro Sensory Nodes is their ability to gather contextual information. For example, in addition to capturing the transaction details, the nodes might also record the ambient temp or signal interference levels if the transaction occurs in a crowded environment, such as a busy subway station where multiple NFC devices are in use. This additional layer of context helps the system differentiate between normal operational conditions and potentially suspicious activities, such as signal jamming or device tampering.

c. Real-Time Monitoring: Neuro Sensory Nodes continuously monitor the operational status of the card and the external devices it interacts with. For example, if the card is used at an ATM, the nodes would monitor the machine's operational health, such as detecting any signs of skimming devices attached to the ATM or any irregularities in the machine's response times. They would also capture the exact time of the transaction, the type of withdrawal (cash, balance inquiry, etc.), and the ATM's physical location, comparing this data against the cardholder's typical transaction behavior to detect anomalies.

d. Data Transmission: After collecting and processing the data, the Neuro Sensory Nodes transmit this information to other components within the Neuromorphic Card, such as the Data Validator and the Neuromorphic Tiny AI Module. For instance, in an online purchase scenario, the nodes would capture the IP address of the website, the type of browser used, and the transaction details. This data is then sent to the Data Validator, which cross-references it with stored patterns and keys to verify its authenticity. The Neuromorphic Tiny AI Module would analyze the data for any signs of fraudulent activity, such as unusual purchasing patterns or discrepancies in the IP address's geographical location compared to the cardholder's previous transactions.

Here are examples of potential neuro sensory nodes in action.

a. Retail Transaction: Consider a cardholder making a purchase at a retail store using the Neuromorphic Card with an EMV chip reader. The Neuro Sensory Nodes would capture the transaction amount, the store's location, and the specific terminal ID. Additionally, they would record the time of the transaction and detect any physical alterations to the terminal that might suggest tampering. This data is crucial for ensuring that the transaction is legitimate and that the terminal has not been compromised.

b. Contactless Payment: In a contactless payment scenario, such as a commuter tapping their card on an NFC reader at a subway station, the Neuro Sensory Nodes would gather data on the communication between the card and the reader, including the proximity of the card to the reader, the duration of the interaction, and any environmental interference. If the signal strength is weaker than expected or if there are unusual delays in the data transmission, the nodes might flag the transaction for further analysis, helping to prevent fraud in high-traffic environments.

c. ATM Withdrawal: During an ATM withdrawal, the Neuro Sensory Nodes would collect data on the ATM's operational status, including its response times, the exact location of the machine, and any signs of physical tampering, such as a card skimmer. They would also capture the transaction details, such as the withdrawal amount and the cardholder's PIN entry behavior. If the nodes detect any inconsistencies, such as a withdrawal occurring far from the cardholder's usual locations, the system could trigger additional security checks before completing the transaction.

d. Access Control: In a secure office building that uses RFID-enabled cards for access control, the Neuro Sensory Nodes would monitor the communication between the card and the RFID reader, capturing data such as the reader's response time, the proximity of the card, and any abnormal patterns in the access request. For instance, if the card is used at an unusual time or in a location that the cardholder does not typically access, the nodes might alert the system to a potential security issue.

The bottom line is that Neuro Sensory Nodes are critical to the overall functionality and security of systems like the Neuromorphic Card. By capturing and processing a vast array of data in real-time, these nodes ensure that every transaction is thoroughly analyzed and validated, protecting against unauthorized access and fraud. Their ability to integrate contextual information with transaction-specific data makes them a powerful tool in the ongoing effort to secure financial transactions in an increasingly digital world.

Once the Neuro Sensory Nodes have collected this diverse array of data, it is transmitted to the Data Validator, labeled as 314. The Data Validator is a critical component that ensures the integrity of the transaction by verifying the authenticity of the data received from the sensory nodes. For instance, if the card is used at an ATM, the Data Validator would cross-reference the transaction data—such as the ATM's location, the time of withdrawal, and the encrypted PIN—with pre-stored patterns and encryption keys housed in the TinyDB, labeled as 320. The TinyDB is a highly secure data storage system that uses advanced memristor technology, which allows it to retain information even when the power supply is interrupted. This feature is particularly important for ensuring that critical data such as encryption keys, transaction patterns, and historical transaction logs are preserved securely over time. The memristor-based TinyDB acts as the central repository of the system's knowledge, storing data that the Data Validator can access instantly to perform real-time checks. For example, during an ATM transaction, the Data Validator might detect that the transaction is taking place in an unusual location for the cardholder. By comparing this with the cardholder's transaction history stored in the TinyDB, the Validator could flag the transaction as potentially fraudulent if it deviates significantly from the expected behavior.

The Data Feeder, labeled as 316, plays a crucial role in the system by organizing and formatting the validated data before it is stored in the TinyDB. This component ensures that all transaction data is logically structured, making it easy to retrieve and analyze in future transactions. For example, after the Data Validator confirms the legitimacy of an ATM withdrawal, the Data Feeder would ensure that the details of the transaction—such as the amount withdrawn, the ATM's location, and the time—are accurately formatted and stored in the TinyDB. This structured storage is essential for maintaining the system's efficiency and ensuring that the data can be quickly accessed by the Neuromorphic Tiny AI Module and the Data Validator in subsequent transactions. The Data Feeder's role is particularly important in scenarios where a high volume of transactions is processed, such as in a busy retail environment or during peak hours at an ATM, where the ability to quickly store and retrieve data is critical to the smooth operation of the system.

In the context of the Neuromorphic Card system, a Data Feeder is a vital component responsible for organizing, formatting, and transmitting validated data to a storage system like the TinyDB. The purpose of a Data Feeder is to ensure that data is efficiently structured and readily accessible for future analysis. This component plays a crucial role in maintaining the system's overall efficiency by managing how data is stored, making it easy to retrieve and process during subsequent transactions.

One example of a Data Feeder in this system could be middleware solutions such as Apache Kafka or RabbitMQ. These systems can collect validated data from various components, such as the Data Validator, and then structure, format, and transmit this data to the TinyDB. Middleware like this is particularly effective in environments where large volumes of data need to be processed in real-time. For instance, Apache Kafka might collect transaction logs, format them according to predefined schemas, and then feed them into the TinyDB for storage.

Another example is a custom-built software module designed specifically for the Neuromorphic Card. This module could serve as a Data Feeder by receiving raw data from the Data Validator, organizing it into a standardized format, and then transmitting it to the TinyDB. For example, it could take transaction details such as timestamps, transaction amounts, and location data, then format these into a JSON or XML structure optimized for fast retrieval and analysis by the Neuromorphic Tiny AI Module in future transactions.

Another approach involves using data serialization frameworks like Protocol Buffers (Protobuf) or Apache Avro. These frameworks can act as Data Feeders by converting complex data structures into a compact binary format that is easier to store and transmit. For instance, Protobuf might serialize validated transaction data into a binary format, reducing the data's size before feeding it into the TinyDB, thereby improving storage efficiency and speed.

Data aggregators can also serve as Data Feeders by collecting data from multiple sources within the Neuromorphic Card system, summarizing or consolidating this data, and then feeding the aggregated results into the TinyDB. An example of this might involve a tool that collects transaction data over a specified period, aggregates the total transaction amounts, and stores these summaries in the TinyDB, making it easier to analyze spending patterns over time.

ETL (Extract, Transform, Load) tools like Talend or Apache NiFi are another type of Data Feeder. These tools are designed to extract data from various sources, transform it into the desired format, and load it into a storage system. In the Neuromorphic Card system, an ETL tool could extract validated data from the Data Validator, transform it according to the system's storage schema, and load it into the TinyDB. For example, Talend might handle data transformations such as normalizing date formats, converting currency values, or applying encryption before storing the data securely.

Database middleware, such as Oracle GoldenGate or Microsoft SQL Server Integration Services (SSIS), can also function as Data Feeders. These tools can collect data from real-time transactions, apply necessary formatting and transformations, and direct the data into the TinyDB. For instance, Oracle GoldenGate could continuously capture changes in transaction data and replicate them to the TinyDB in near real-time, ensuring that the data is always up-to-date and properly formatted for future use.

Each of these examples illustrates how a Data Feeder can be tailored to the specific needs of the Neuromorphic Card system, depending on factors like the volume of data being processed, the required speed of data transmission, and the complexity of the data structures involved. By efficiently managing how data is organized, formatted, and stored, Data Feeders are essential in maintaining the overall performance and security of the system.

The Memristors, labeled as 318, are the underlying technology that powers the TinyDB's storage capabilities. Memristors, short for "memory resistors," are a type of non-volatile memory technology that retains information without requiring a continuous power supply. They are considered the fourth fundamental passive circuit element, alongside resistors, capacitors, and inductors.

A memristor's unique ability lies in its capacity to "remember" the amount of charge that has passed through it, effectively storing information as resistance. When a voltage is applied to a memristor, its resistance changes in response to the magnitude and direction of the current. Crucially, once the voltage is removed, the memristor retains its resistance level, allowing it to store data even when the power is turned off. This behavior is what makes memristors a promising technology for non-volatile memory applications.

Memristors operate based on the movement of ions within a material, typically a thin layer of a metal oxide, like titanium dioxide (TiO2). When an electrical field is applied, ions in the oxide move, changing the material's resistance. The movement of these ions is what enables the memristor to store information. This process is reversible, meaning the memristor can be written to and erased multiple times, similar to how flash memory or other types of non-volatile memory work.

One of the key advantages of memristors is their potential for high-density memory storage with faster read/write speeds compared to traditional storage technologies like flash memory. Memristors can theoretically store more data in a smaller physical space and operate at lower power levels, making them an attractive option for future computing and memory storage solutions. Additionally, memristors have the potential to improve the performance of artificial intelligence (AI) and neuromorphic computing systems because they can mimic the way synapses work in the human mind, allowing for more efficient processing of information in systems that require parallel computing.

In summary, the use of memristors in the TinyDB is a groundbreaking approach that combines the functions of memory and processing into a single element. Their ability to retain information without power, along with their potential for high-density storage and fast operation, positions them as a critical component in the future of computing, particularly in applications that demand low power consumption, high performance, and non-volatility.

More specifically, the characteristics of memristors are crucial for the secure storage of sensitive information, such as encryption keys and transaction histories, which must remain protected even when the card is not in use. For instance, in a scenario where the card is lost or stolen, the memristors would ensure that all stored data remains intact and secure, preventing unauthorized access to critical information. The connection between the Memristors and the TinyDB guarantees that all data is safeguarded against potential security breaches, providing a robust defense against data loss and ensuring the system's resilience in the face of various threats.

Central to the Neuromorphic Card's processing capabilities is the Neuromorphic Tiny AI Module, labeled as 324. This module acts as the decision-making engine of the card, responsible for analyzing the data captured by the Neuro Sensory Nodes and validated by the Data Validator. The Neuromorphic Tiny AI Module employs advanced computational techniques, including pattern recognition and anomaly detection, to scrutinize the data in real-time. For example, during an online purchase, the Neuromorphic Tiny AI Module might analyze the transaction details—such as the website's IP address, the time of the transaction, and the purchase history—to detect any irregularities that could indicate fraudulent activity, such as an unusually large purchase or a transaction from an unfamiliar device. The module's ability to process large volumes of data swiftly allows it to detect any irregularities or anomalies that could indicate fraudulent activity. Its sophisticated algorithms are designed to learn from each transaction, continuously improving its ability to detect and prevent fraud by adapting to new and emerging patterns and threats. This adaptive learning capability is a key feature of the system, ensuring that it remains effective in protecting against a wide range of security risks, even as fraudsters develop more sophisticated methods of attack.

The Neuromorphic Tiny AI Module 324 includes a Tiny AI Engine, labeled as 322 in the Neuromorphic Card system, which is a pivotal component designed to process and analyze data in real-time and perform all AI functionality. This engine is integral to the card's ability to make informed, intelligent decisions during transactions, ensuring that each operation is secure, efficient, and accurate. The Tiny AI Engine is engineered to mimic certain cognitive functions by utilizing neuromorphic computing techniques, which are inspired by the architecture and functioning of biological neural networks. This design allows the engine to process large amounts of data quickly and to learn from each interaction, continually improving its performance and adaptability.

The operation of the Tiny AI Engine begins with the reception of data from various sources within the Neuromorphic Card. This data is captured by the Neuro Sensory Nodes and validated by the Data Validator before being transmitted to the Tiny AI Engine. The data can include a wide range of information, such as transaction details (amount, location, time), contextual factors (environmental conditions, device status), and historical data (past transaction patterns, stored in the TinyDB). The Tiny AI Engine takes this data and performs a sophisticated analysis to determine whether the transaction is legitimate or if there are signs of potential fraud.

One of the functions of the Tiny AI Engine can be pattern recognition. The engine uses advanced algorithms to compare the incoming data against stored patterns in the TinyDB. For example, if the cardholder typically makes purchases within a specific geographic area and the current transaction occurs far outside this area, the Tiny AI Engine might flag this as an anomaly. The engine analyzes such patterns across multiple dimensions, including spending habits, transaction locations, times of day, and even the types of merchants frequented by the cardholder. By recognizing these patterns, the engine can quickly identify transactions that deviate from the norm, which could indicate fraudulent activity.

Another critical aspect of the Tiny AI Engine's operation is anomaly detection. The engine is designed to detect unusual or suspicious behavior that could signal a security threat. For instance, if a transaction is attempted at an unusual time or through a device that has not been used before by the cardholder, the engine might classify this as an anomaly. It could then trigger additional security measures, such as requiring further authentication or temporarily halting the transaction until it is verified. The engine's ability to detect anomalies is enhanced by its use of machine learning techniques, which allow it to adapt and improve over time. As the engine processes more transactions, it "learns" what constitutes normal behavior for a given cardholder, making it increasingly adept at spotting irregularities.

The Tiny AI Engine also plays a crucial role in decision-making. After analyzing the data and identifying any potential risks, the engine must make a decision about whether to approve or reject the transaction. This decision is based on a combination of factors, including the results of the pattern recognition and anomaly detection processes. The engine weighs the various risk indicators it has identified and applies pre-set rules or thresholds to determine the outcome. For example, if the engine detects multiple risk factors, such as a high transaction amount at an unfamiliar location, it might decide to reject the transaction or escalate it for further review. Conversely, if the transaction appears consistent with the cardholder's usual behavior, the engine will approve it, allowing the payment to proceed.

An important feature of the Tiny AI Engine is its real-time processing capability. The engine is designed to operate with minimal latency, meaning it can analyze data and make decisions almost instantaneously. This is essential in high-stakes environments like financial transactions, where any delay could not only inconvenience the user but also expose the system to increased risk. The real-time nature of the Tiny AI Engine ensures that each transaction is assessed and processed swiftly, maintaining a seamless user experience while also safeguarding against potential threats.

Furthermore, the Tiny AI Engine is adaptive, meaning it continuously refines its algorithms based on new data. As it encounters more transactions, the engine improves its ability to detect subtle patterns and anomalies, becoming more effective at preventing fraud and ensuring security. This adaptability is powered by machine learning techniques, where the engine uses data from past transactions to refine its models and improve its predictions. Over time, the engine becomes more accurate, reducing false positives (where legitimate transactions are incorrectly flagged) and false negatives (where fraudulent transactions are missed).

In summary, the Tiny AI Engine 322 is a sophisticated and essential component of the Neuromorphic Card system in general and the Neuromorphic Tiny AI Module in particular, operating at the intersection of data processing, pattern recognition, anomaly detection, decision-making, etc. It leverages advanced neuromorphic computing techniques and machine learning to analyze transaction data in real-time, identifying potential threats and making intelligent decisions about whether to approve or reject transactions. Its ability to learn and adapt over time ensures that the system remains effective in a constantly evolving landscape of security threats, providing robust protection for cardholders while maintaining a seamless and efficient transaction process.

The final component in this complex system is the Approval Module, labeled as 312. The Approval Module is the ultimate authority in the transaction process, making the final decision on whether a transaction should be approved or rejected based on the data that has been validated and analyzed by the other components. For example, after the Neuromorphic Tiny AI Module has processed the transaction data from an online purchase and identified no irregularities, the Approval Module would then authorize the transaction, allowing the payment to proceed. Conversely, if the AI Module detected potential fraud, such as a mismatch between the cardholder's usual purchase behavior and the current transaction, the Approval Module could reject the transaction, preventing the fraudulent payment from being completed. The Approval Module operates independently to ensure that its decision is based solely on the integrity of the data and the security protocols that have been rigorously applied throughout the transaction process. By centralizing the approval process within the card, the system minimizes the risk of external interference or manipulation, ensuring that only transactions that have passed all validation checks are authorized to proceed. This independence is critical for maintaining the system's integrity and for ensuring that all transactions are processed in a secure and reliable manner.

In conclusion, FIG. 3 presents a highly detailed and sophisticated system in which each component plays a critical and specific role in securing card transactions. The Neuromorphic Card, with its integration of Neuro Sensory Nodes, Data Validator, TinyDB, Memristors, Data Feeder, Neuromorphic Tiny AI Module, and Approval Module, creates a comprehensive and adaptive framework that provides robust protection against unauthorized access and fraud. The system's ability to capture, analyze, validate, and store transaction data in real-time ensures that it can effectively defend against modern electronic payment threats. By leveraging advanced technologies such as neuromorphic computing and memristor-based storage, the system provides a powerful, efficient, and highly secure solution for safeguarding sensitive financial transactions against an ever-evolving landscape of security threats. This system not only exemplifies the cutting edge of payment security technology but also represents a significant advancement in the field, offering unparalleled protection for users and institutions alike.

FIG. 4 illustrates an intricate and highly secure process flow designed to update the data on a neuromorphic card a/k/a smart card. This process is meticulously crafted to ensure the highest level of security and integrity throughout each step. The sequence begins within the data center, where critical information is stored in two primary tables, known as "Data Center Table 400" and "Data Center Table 402." These tables house a wealth of vital data, including the card's unique identification number, the current and latest versions of the data stored on the card, and an indicator of whether the card is active, as shown by a flag that toggles between true or false. Additionally, these tables contain essential security elements such as the "Authorized Short Code" and the "Sync Up Encode Key," which are integral to maintaining the security of the data during its transfer and subsequent storage on the card.

The data update process is initiated when the cardholder brings their card close to a mobile device capable of establishing a Near Field Communication (NFC) connection. This action is the first step in a carefully controlled sequence, as indicated by the instruction "Bring Card Near Mobile Device—412." However, before any data can be transmitted, the system requires explicit approval from the cardholder. This is a crucial security measure designed to ensure that the data update cannot proceed without the cardholder's active consent. The approval is facilitated through a prompt on the cardholder's mobile device, which is represented by "User Has To Approve The Notification Through Mobile Device—410." This step underscores the importance of user involvement in maintaining the security of their own data.

Once the user has granted approval, the process of data transfer commences, as indicated by "Uploading—414." The data is securely transmitted from the data center to the card via the mobile device. This transfer is executed over the NFC channel, which provides a secure and direct means of communication between the devices. During this stage, the data is not simply transmitted; it undergoes a rigorous validation process to ensure its integrity and authenticity. This is where the "Data Validator" plays a pivotal role. The Data Validator receives an encryption key from the NFC interaction, which is crucial for decrypting and verifying the data. The encryption key ensures that the data remains secure during the transfer, preventing unauthorized access or tampering.

The Data Validator's primary responsibility is to rigorously check the incoming data against predefined security standards and patterns. It verifies that the data has not been altered and that it corresponds to the expected format and content. If the data passes these stringent checks, it is then passed on to the "Data Feeder." The Data Feeder is a critical component in this process, as it is responsible for extracting the validated data from the Data Validator and preparing it for storage. This involves segregating the data into the appropriate format, which is necessary for efficient storage and retrieval in future transactions. The Data Feeder meticulously organizes the data, ensuring that all crucial pieces of information, such as the machine type, model, decode key, authorized short code, sync up short code, sync up encode key, and the activation status of the card, are properly formatted and ready for storage.

Following the organization and formatting by the Data Feeder, the data is stored in the "Tiny DB," a highly specialized database embedded within the smart card. The Tiny DB utilizes memristor technology, a form of non-volatile memory that is particularly well-suited for this application due to its ability to retain data even when the card is not powered. This characteristic is especially valuable for smart cards, as it ensures that the data remains secure and intact even in the event of power loss, theft, or physical tampering. The Tiny DB securely stores all essential data elements, including details about the machines the card interacts with, the specific model information, decode keys, authorized short codes, sync up short codes, sync up encode keys, and the card's activation status. This comprehensive storage ensures that the card is fully equipped to validate and secure future transactions.

A key feature of the process is the use of a "Dynamic Short Hash Key—404," which is uniquely tied to the card's model and manufacturer. This dynamic short hash key is generated specifically for each transaction, ensuring that the data being synchronized is unique and secure. The dynamic nature of this key significantly enhances security by making it exceedingly difficult for unauthorized parties to intercept or reuse the data. The dynamic short hash key is encrypted and provided to the Data Validator during the validation process, further bolstering the security measures in place.

As the data transfer continues, the NFC signal plays a crucial role in facilitating the secure transmission of data, as indicated by "Data Will Be Transferred Through NFC Signal—418." Once the data reaches the card, the Data Validator decrypts the short code using the encryption key provided during the NFC interaction. The decrypted data is then meticulously compared against the data already stored in the Tiny DB. If the data matches and successfully passes all the validation checks, the system proceeds to confirm the successful update of the card's data, as indicated by "Successful Update of Data to Card—424." This confirmation step is critical, as it ensures that the data on the card has been securely updated and is ready for use in future transactions.

To further ensure the security of the process, the system employs an advanced encryption mechanism that protects the short code throughout the entire operation, as highlighted by "Encryption of Short Code Using Encryption Mechanism is Provided to Data Validator—428." This encryption mechanism is designed to prevent unauthorized access to the data by ensuring that even if the data were intercepted, it would be rendered useless without the correct decryption key.

Another vital aspect of this process is the establishment of a secure connection between the card and the mobile device. Once the NFC connection is successfully established, a unique connection key is generated and shared between the devices, as noted in "Key Connection Established When The Connection Was Successful, The Connection Key Will Be Shared—426." This connection key is critical for securing the communication channel between the card and the mobile device, ensuring that all data exchanged during the transaction is encrypted and protected from potential interception or tampering.

Throughout the entire process, the system continuously monitors and updates various statuses, including the activation status of the card, the version of the data being updated, and the dynamic short codes used for synchronization. Each of these elements is carefully tracked to ensure the integrity and security of the card's data. The combination of these steps and the advanced technologies involved-such as dynamic encryption, NFC communication, and the neuromorphic Tiny AI module-provides a robust and comprehensive method for securely updating the data on a smart card. This process not only protects the cardholder's information from unauthorized access but also ensures that the card remains secure and functional for all future transactions.

Furthermore, the neuromorphic Tiny AI module embedded within the card plays a crucial role throughout this entire process. This module is designed to mimic the architecture and function of the human mind, allowing it to process multiple streams of data simultaneously. This parallel processing capability enables the AI module to analyze and compare the incoming data with stored patterns in real-time, ensuring that any discrepancies are detected immediately. The Tiny AI module's ability to learn from previous transactions and adapt to new patterns enhances the card's security, making it increasingly difficult for fraudulent activities to go undetected.

In addition to the Tiny AI module, the sensory nodes integrated into the card are strategically placed at all points of data interaction, including the EMV chip, magnetic stripe, and contactless interfaces such as NFC and RFID. These sensory nodes are responsible for capturing detailed information from the external devices the card interacts with, such as ATMs or POS terminals. The data captured by these sensory nodes includes environmental and contextual data, such as the time and location of the transaction, which is then transmitted to the Tiny AI module for analysis. This comprehensive data capture ensures that the AI module has all the information it needs to make informed decisions about the legitimacy of a transaction.

The system also includes mechanisms for secure data synchronization between the smart card and external devices. For instance, when a cardholder initiates a transaction at an ATM, the card can securely synchronize its stored data with the ATM, ensuring that both devices are operating with the most up-to-date information. This synchronization is protected by the same dynamic encryption and validation mechanisms that secure the transaction data, preventing unauthorized data from being introduced into the system.

Another critical feature of the system is its capability for adaptive learning and continuous improvement. The Tiny AI module continuously analyzes transaction data and updates its validation criteria based on emerging fraud techniques and patterns. This adaptive learning capability ensures that the system remains effective and resilient, even as fraudsters develop new and more sophisticated methods of attack. By integrating machine learning within the neuromorphic computing framework, the system can identify new patterns of fraudulent activity that were not previously known and adjust its defenses accordingly.

Moreover, the system is designed with minimal power consumption in mind, making it ideal for use in portable and battery-powered devices such as smart cards. The efficiency of neuromorphic computing combined with the low power requirements of memristor technology ensures that the system can operate for extended periods without requiring frequent recharging or maintenance. This low power requirement is particularly important for applications in remote or resource-constrained environments, where reliable power sources may not be readily available.

In summary, the process depicted in FIG. 4 represents a sophisticated and multi-layered approach to updating and securing data on a smart card. Each phase of the process—from user approval and data transfer to validation, encryption, and storage—is meticulously designed to ensure the highest level of security. The integration of advanced technologies such as the neuromorphic Tiny AI module, dynamic encryption, and memristor-based storage provides a robust defense against a wide range of fraudulent activities, ensuring that the cardholder's information remains secure at all times. This comprehensive system not only addresses current security challenges but is also equipped to adapt to future threats, making it a forward-looking solution for protecting electronic transactions in an increasingly digital world.

FIG. 5 provides an extensive and detailed representation of the system process involved in synchronizing data between a smart card and various external devices, specifically ATMs (Automated Teller Machines) and POS (Point of Sale) terminals. This figure, titled "Sample System Process for Data Sync Up with ATM and POS Flow," outlines the critical interactions and security measures taken to ensure that the data stored on the card is consistently updated and aligned with the most current information available within the system's data center.

The process begins with the "Sync Up Short Code," which is a vital security element generated specifically for synchronizing the card's data. The card information displayed in the figure includes several key elements, such as the card number, the latest version of the data, the current version of the data, and a status indicator that shows whether the card is active. This status is represented by a flag that can be either "True" or "False," indicating whether the card is currently active and capable of engaging in transactions. Additionally, the system tracks the "Sync Up Encode Key," which is crucial for encrypting the data to ensure that it remains secure during the synchronization process.

The figure illustrates specific examples of data entries for various machines, demonstrating the system's capacity to handle multiple devices and their associated data. For instance, the entry labeled "ATM ATMAA78V" represents an ATM machine with its associated version, including the sync up short codes "ATDDIE45678SYN" and "ATDDIE89745SYN," which are encrypted using the sync up encode key "7865rtgdhyuiop1." The status of this machine is marked as "True," indicating that it is currently active and that the data stored on the card is synchronized with the latest version available in the data center. Similarly, for a POS device labeled "POS POSAA56V," the system records sync up short codes "POPIN547891SYN" and "POPIN698712SYN," encrypted with the key "Sdfsdfs8745fgdfg," and confirms that the data is active and up-to-date.

The sync up process is initiated by the neuromorphic sensory nodes, represented by "Neuro Sensory Nodes— 310A . . . 310N." These sensory nodes are integral to the system, as they are responsible for detecting and carrying essential information from the card to the data center. According to the figure, "502: The Sensory Nodes Will Carry The Manufacture Information And Collects The Sync Short Code And Encodes It With The Sync Encode Key." This step is crucial because it ensures that the data transmitted to the data center is securely encrypted, protecting it from potential interception or tampering during transmission.

Once the sensory nodes have collected and encrypted the necessary information, they share this data with the data center, as indicated by "504: Sensory Nodes Share Information To The Data Center." The data center, labeled as "Datacenter—406 ATM/POS Version DB," plays a central role in managing and verifying the data. It receives the encrypted information from the sensory nodes and then checks it against the latest versions stored in its database, as described in "506: Data Center Will Receive The Information From The Sensory Node And It Will Check The ATM/POS Latest Version." This verification step is essential for ensuring that the data on the card matches the most current and authorized version available within the system, thus preventing any discrepancies or unauthorized updates.

The system also incorporates a specialized "Neuromorphic Intelligent Card Information Data Center," which has the capability to identify the appropriate encryption mechanism and decode the short code when necessary. This process is detailed in "508: Neuromorphic Intelligent Card Information Data Center Identifies The Encryption Mechanism And Decode The Short Code And Share The Latest Version To The Card." This ensures that the data shared with the card is both secure and accurate, reflecting the latest information available.

In the figure, the data center maintains comprehensive records for each machine type (such as ATM or POS), including its version, activation status, and associated sync up short codes. For example, an entry for an ATM machine might be detailed as follows: "Machine: ATM, Version: ATMAA78V, Is Active: True, Sync Up Short code: ATDDIE45678SYN, ATDDIE89745SYN, Sync Up Encode Key: 7865rtgdhyuiop1." This level of detail is replicated across all machines managed by the system, ensuring that each interaction is securely logged and verified.

The data center also manages instances where the machine is not active or where the sync up codes have not been successfully encrypted. These scenarios are indicated by entries where the "Is Active" flag is set to "False," and the sync up codes may not be present or correctly encoded. For instance, an inactive POS machine might be recorded as "Machine: POS, Version: POSAA55V, Is Active: False, Sync Up Short Code: Vbsrtw56478sdffs."

As the sync up process continues, the encrypted sync up codes are transmitted to ensure that the card's data remains synchronized with the latest version stored in the data center. The figure shows that this process is repeated for multiple machines, including various ATMs and POS devices, with each iteration ensuring that the card's data is accurately updated and consistent with the data center's records.

Furthermore, the system ensures that each sync up code is encrypted during transmission, as indicated by the repeated entries in the figure stating "Sync Up Code Encrypted." This encryption step is critical for maintaining the confidentiality and security of the data, ensuring that even if the data were intercepted during transmission, it would be useless without the correct decryption key.

Overall, FIG. 5 illustrates a highly secure and comprehensive system for managing the synchronization of data between a smart card and external devices such as ATMs and POS terminals. The figure meticulously details each step of the process, from the initial collection and encryption of data by the sensory nodes to the verification and synchronization of this data by the data center. The use of advanced technologies such as neuromorphic sensory nodes, encrypted sync up codes, and a dedicated data center for managing encryption mechanisms ensures that the system is robust and resilient against potential threats, providing a reliable means of securing and updating smart card data in real-time.

FIG. 6 provides an exhaustive and detailed illustration of the system process for validating transactions using a smart card, focusing particularly on the critical interactions between the card, external devices such as POS (Point of Sale) terminals and contactless card readers, and the back-end systems responsible for ensuring transaction security. This figure, titled "Sample System Process for Transaction Validation Flow," captures the complexity and thoroughness of the transaction validation procedure, emphasizing the layers of security and verification that are integrated into the system to protect against unauthorized access and fraud.

The process begins when a transaction is initiated at a POS terminal or through a contactless card reader, as indicated by the labels "POS" and "Contactless Card." These devices represent the external points of interaction where the smart card is used to make a payment or access services. At the center of this interaction are the neuromorphic sensory nodes embedded within the smart card, labeled "Neuro Sensory Nodes—310A . . . 310N." These sensory nodes are designed to be the first point of contact in the transaction process, playing a crucial role in gathering and processing the necessary information required to validate the transaction.

As soon as the transaction is initiated, the sensory nodes begin their critical function by establishing communication with the external device. This is depicted in the figure with the notation "600: Communicate to Sensory Nodes." The sensory nodes are tasked with requesting authentication information from the device that is currently handling the card's data. This step, described in "602: When Transaction Is Being Initiated, The Sensory Nodes Attached To The Card Will Request For Authentication Information From The Devices Which Is Currently Dealing With Card Information," is essential for ensuring that the card only engages in transactions with devices that can provide valid and legitimate authentication credentials. This safeguard helps prevent the card from interacting with fraudulent or unauthorized devices.

Once the sensory nodes have requested and received the necessary authentication information, they proceed to send short code information to the external device. The short code is a dynamic and encrypted sequence generated specifically for the transaction, ensuring that each interaction is unique and secure. The figure details this step as "604: The Sensory Nodes Will Send The Short Code Information Currently Being Maintained In The Version Encoded With Authorization Encrypt Key." The short code stored on the card is carefully retrieved by the sensory nodes and encoded with an authorization encryption key before being transmitted. This encryption step is vital for maintaining the security of the data as it is transferred between the card and the external device, ensuring that it cannot be intercepted or altered by malicious actors.

Following the transmission of the short code, the transaction process progresses to the "Data Validator," which is a critical component in the validation sequence, as indicated by "612: Data Validator." The Data Validator's role is to ensure that the short code sent by the sensory nodes is accurate and corresponds to the information stored within the system's backend. To achieve this, the Data Validator works in conjunction with the data center, labeled "Datacenter—406," which holds the most current and authoritative version of the necessary data.

The data center plays a pivotal role in decoding and verifying the short code. As described in "606: The Neuromorphic Intelligent Card Information Data Center Identifies The Encryption Mechanism And Decode The Short Code," the data center first identifies the appropriate encryption mechanism that was used to encode the short code. It then applies the correct decryption method to decode the short code. This process is crucial because it ensures that the data received by the Data Validator is legitimate and has not been tampered with during transmission.

To perform the decryption, the data center utilizes a "Decode Key—608," which is specific to the machine and transaction involved. For instance, in the example provided in the figure, the data center handles a POS machine from the manufacturer PineLabs. The relevant details include the current and latest version of the machine's data, both labeled "ATMAA78V," the decode key "91dftyuosgfewrrtfsfsd," and the authorize short code "POPIN654AUT." This detailed information is critical for ensuring that the transaction is being conducted with a legitimate machine that matches the stored records.

After decoding the short code, the process returns to the Data Validator, which must now compare the decoded short code with the information stored in the card's internal "Tiny DB" (Tiny Database). The Tiny DB is a secure, non-volatile storage component embedded within the smart card, holding all the necessary data for validating transactions. The process is described in "610: The Data Validator Will Pull The Decode Key From The Tiny DB And Extracts The Short Code." The Data Validator retrieves the decode key from the Tiny DB and uses it to extract the short code, which it then compares against the decoded short code provided by the data center.

The validation of the short code is a critical juncture in the transaction process. This step, detailed as "614: The Short Code Is Now Validated With Short Code In The Tiny DB. Once It Is Authorized, Then The Card Starts Transferring Its Card Information," ensures that the transaction can only proceed if the short codes match perfectly. If the short code is validated successfully, it confirms that the machine is legitimate and that the data has not been compromised. Only at this point does the card begin transferring its sensitive information, such as payment details or identification data, to the external device.

Following the successful validation of the short code, the system proceeds to verify additional details to confirm that the machine involved in the transaction is indeed valid. This is described in "616: Extract the Info Using the Decode Key and Verifying the Valid Machine." This step involves a thorough check using the decode key to ensure that all aspects of the transaction align with the stored records, further preventing any possibility of fraud or unauthorized access.

The final phase of the transaction validation process involves the "Approver," a decisive component that determines whether the transaction will proceed. The Approver's role is to assess the legitimacy of the transaction based on the validation and verification steps completed earlier. If the Approver identifies any discrepancies or signs of fraud, it will decline the transaction, as outlined in "618: Approver Will Approve The Legitimate Transaction Or Declines It, If It's A Fraudulent Transaction And No Data Will Be Transferred Further." This step is crucial for protecting the cardholder's data, ensuring that no information is transmitted in cases where the transaction fails the validation checks.

If the transaction is deemed legitimate, the Approver authorizes and initiates the actual transaction flow, as described in "620: Approver Will Authorize And Initiate The Actual Transaction Flow." This marks the final step in the process, where the transaction is completed, and the card's data is securely transmitted to the external device, finalizing the payment or service access.

Throughout FIG. 6, the detailed and meticulous interactions between the smart card, its neuromorphic sensory nodes, the data center, Data Validator, and Approver illustrate a robust and multi-layered approach to securing transactions. The use of dynamic short codes, sophisticated encryption mechanisms, and rigorous validation steps ensures that each transaction is thoroughly vetted and protected against fraud and unauthorized access. This system exemplifies a highly secure method for managing electronic transactions, providing a comprehensive framework that safeguards the cardholder's data at every stage of the process.

FIG. 7 illustrates a sample sequence diagram of operations involved in validating and synchronizing transactions using a neuromorphic smart card system. The diagram maps out sample interactions between the critical components of the system: the Neuromorphic Card, Sensory Nodes, Neuromorphic AI Module, TinyDB, Data Feeder, and an External Device, such as a Point of Sale (POS) terminal or an Automated Teller Machine (ATM). Each step, numbered from 700 to 734, corresponds to a specific action taken within the system, illustrating the meticulous process by which transactions are securely validated, processed, and synchronized.

The sequence begins with the activation of the sensory nodes within the Neuromorphic Card, as indicated by step 700, which states "Activate sensory nodes." These sensory nodes are fundamental to the card's operation, as they initiate communication with the external device by detecting and capturing the relevant data required for the transaction. Upon activation, these nodes immediately start their crucial task of gathering data from the external device, including the device's data pattern and an associated short code, as described in step 702: "Capture device data pattern and short code." The device data pattern refers to specific characteristics such as the device's model, version, and other unique identifiers, while the short code is a dynamically generated, encrypted sequence that serves as a key component for authenticating the transaction.

Once the sensory nodes have captured this critical information, they transmit the collected data to the Neuromorphic AI Module embedded within the card, as shown in step 704: "Transmit device data pattern and short code." The Neuromorphic AI Module is a highly advanced processing unit designed to handle complex validation tasks. Its first action upon receiving the data is to retrieve the necessary decode key from the TinyDB, the card's secure internal database, as outlined in step 706: "Retrieve decode key." The TinyDB is a specialized storage system within the card that securely holds essential information, including encryption keys, data patterns, and transaction logs, all of which are vital for the validation process.

With the decode key retrieved, the Neuromorphic AI Module proceeds to decrypt the short code, as indicated by step 708: "Decrypt short code using decode key." This decryption process is critical for converting the encrypted short code into a readable format that can be compared against stored data to ensure its validity. The decrypted short code is then meticulously compared with pre-stored data patterns within the system, a step detailed in "710: Compare decrypted short code with pre-stored data patterns." These data patterns are derived from previous legitimate transactions and serve as a benchmark for determining the authenticity of the current transaction. By comparing the decrypted short code with these patterns, the system can detect any anomalies or inconsistencies that might suggest fraudulent activity.

Following this comparison, the Neuromorphic AI Module makes a critical decision: it generates either an approval or rejection signal based on the results of the validation. This decision-making process is captured in step 712: "Generate transaction approval or rejection signal." If the comparison confirms that the transaction is legitimate and aligns with the pre-stored data patterns, the AI Module generates an approval signal, triggering the next phase of the process. This phase involves the preparation of the transaction data by the Data Feeder, as described in step 714: "Signal data feeder to prepare transaction data (if approval)." The Data Feeder is responsible for organizing and formatting the transaction data, ensuring that it is properly structured for secure transmission.

Once the transaction data is prepared, it undergoes a critical encryption process using an authorization encryption key, as outlined in step 716: "Encrypt transaction data with authorization encryption key." This encryption step is vital for safeguarding the transaction data during its transmission to the external device, ensuring that the data cannot be intercepted, altered, or compromised by unauthorized entities. The encrypted transaction data is then securely transmitted to the external device, marking the culmination of the initial transaction phase, as indicated by step 718: "Transmit encrypted transaction data." This step ensures that the transaction data reaches the external device securely, allowing the transaction to be processed further.

If the transaction is approved, the system may need to handle synchronization requests to update the card's internal records accordingly. This synchronization process begins with step 720: "Capture synchronization request (if transaction approved)," where the Neuromorphic Card captures any synchronization request initiated by the external device. This request is subsequently transmitted back to the external device or data center, as detailed in step 722: "Transmit synchronization request." The synchronization request is an essential part of the process, as it ensures that the card's records are consistent with the latest transaction data, reflecting any updates or changes accurately.

Following the transmission of the synchronization request, the Neuromorphic AI Module retrieves the necessary synchronization parameters from the external device or data center, as outlined in step 724: "Retrieve synchronization parameters." These parameters include updated credentials, transaction logs, and other critical data required to synchronize the card's internal database with the latest transaction information. Once these parameters are retrieved, the Neuromorphic AI Module generates a synchronization response that includes all the updated credentials and logs, as indicated in step 726: "Generate synchronization response with updated credentials and logs." This synchronization response is essential for aligning the card's internal records with the most current transaction data, ensuring accuracy and consistency across the system.

To protect the integrity and confidentiality of the synchronization response, it is encrypted before being sent, as described in step 728: "Encrypt synchronization response." This encryption is crucial for safeguarding the synchronization data during its transmission, preventing any unauthorized access or tampering. The encrypted synchronization response is then organized for efficient transmission, as outlined in step 730: "Organize synchronization response for transmission." This step ensures that the data is correctly structured, facilitating smooth and secure communication between the Neuromorphic Card and the external system.

The encrypted synchronization response is subsequently transmitted back to the external device or data center, as indicated in step 732: "Transmit encrypted synchronization response." This marks the final communication step in the synchronization process, ensuring that all involved parties have the most up-to-date and accurate data. Finally, after the synchronization response is confirmed and received, the TinyDB within the Neuromorphic Card is updated to reflect the synchronization event and any changes that have occurred. This critical update is captured in step 734: "Update TinyDB with synchronization event and changes after confirmation." This final step ensures that the card's internal database remains accurate and up-to-date, fully synchronized with the latest transaction data and ready for future transactions.

Throughout FIG. 7, the sequence of operations highlights a sophisticated and meticulously designed process for validating and synchronizing transactions within a neuromorphic smart card system. Each step is carefully crafted to ensure that every transaction is securely validated, processed, and recorded, utilizing advanced technologies such as neuromorphic computing, dynamic encryption, and secure data storage. This sequence diagram underscores the complexity and robustness of the system, illustrating how each component works in harmony to provide a secure and efficient framework for managing electronic transactions, ultimately protecting the cardholder's data and ensuring the integrity of the system as a whole.

FIG. 8 is a sample class diagram for implementing one or more aspects of the inventions disclosed herein. The class diagram for the neuromorphic smart card system consists of several interconnected classes, each with specific attributes and methods that define their roles and interactions within the system. At the center of this diagram is the 'NeuromorphicCardSystem' class (800), which serves as the main controller for the entire system. This class is composed of several integral components, including 'SensoryNodes' (802), 'NeuromorphicAIModule' (804), 'TinyDB' (806), and 'DataFeeder' (808). Each of these components has its own set of methods that enable them to perform specific tasks necessary for the functioning of the smart card system. The 'NeuromorphicCardSystem' class also interacts with an 'ExternalDevice' (810), which represents any external device the system might engage with, such as a POS terminal or an ATM.

The 'NeuromorphicCardSystem' class contains the following attributes: 'sensory_nodes', 'ai_module', 'tiny_db', 'data_feeder', and 'external_device'. These attributes represent instances of the 'SensoryNodes', 'NeuromorphicAIModule', 'TinyDB', 'DataFeeder', and 'ExternalDevice' classes, respectively. These components are crucial to the system's operation, as they manage the various aspects of transaction processing, from data capture to encryption and synchronization.

The 'NeuromorphicCardSystem' has several methods, each serving a specific purpose within the transaction process. The '_init_( )' method initializes the system, creating instances of the sensory nodes, AI module, TinyDB, and data feeder. The 'connect_to_external_device(device: ExternalDevice)' method connects the neuromorphic card system to an external device, allowing it to begin the transaction process. The 'activate_sensory_nodes( )' method activates the sensory nodes, preparing them to capture data. The 'capture_and_process_device_data( )' method allows the sensory nodes to capture data from the external device and transmit it to the AI module for processing. The 'validate_transaction( )' method initiates the transaction validation process by retrieving the decode key, decrypting the short code, and comparing it with pre-stored data patterns. If the transaction is validated, the 'prepare_transaction_data( )' method signals the data feeder to prepare the transaction data, which is then encrypted using 'transmit_transaction_data(encrypted_data: str)' for secure transmission to the external device. The 'synchronize_data( )' method handles post-transaction synchronization, capturing and transmitting synchronization requests, retrieving synchronization parameters, generating a synchronization response, and organizing the response for transmission. The methods 'capture_sync_request( )→str', 'generate_sync_response(sync_parameters: dict)→dict', and 'organize_sync_response(encrypted_sync_response: str)→str' are specifically used during the synchronization process.

The 'SensoryNodes' class, which is composed within the 'NeuromorphicCardSystem', contains methods crucial to the initial stages of the transaction process. It has no attributes, but it provides the methods 'activate( )', 'capture_data(external_device: ExternalDevice)→(str, str)', and 'transmit_data(device_data: str, short_code: str)'. The 'activate( )' method initializes the sensory nodes, making them ready to capture data. The 'capture_data( )' method captures the external device's data pattern and a short code that is critical for the transaction. The captured data is then transmitted to the AI module via the 'transmit_data( )' method.

The 'NeuromorphicAIModule' class plays a central role in processing and validating the transaction data. It has no attributes but includes several methods that are key to ensuring the transaction's security and validity. The 'decrypt_short_code(short_code: str, decode_key: str)→str' method decrypts the short code using the decode key retrieved from TinyDB, making the data readable for further validation. The 'compare_short_code(decrypted_short_ code: str, data_patterns: list)→bool' method compares the decrypted short code against pre-stored data patterns to determine whether the transaction is legitimate. If the transaction is valid, the 'generate_approval_signal( )' method produces an approval signal; otherwise, the 'generate_rejection_signal( )' method generates a rejection signal. Once the transaction data is prepared, the 'encrypt_data(data: dict)→str' method encrypts it using an authorization encryption key to ensure secure transmission.

The 'TinyDB' class is responsible for managing the secure storage and retrieval of critical data within the neuromorphic card. It does not have attributes but includes methods that are essential for transaction validation and synchronization. The 'retrieve_decode_key(external_device: ExternalDevice)→str' method retrieves the decode key necessary for decrypting the short code. The 'get_data_patterns( )→list' method returns a list of pre-stored data patterns used by the AI module to validate transactions. After a transaction is completed, the 'update(sync_response: dict)' method updates the TinyDB with the details of the synchronization event, ensuring that the system's records remain current and accurate.

The 'DataFeeder' class is tasked with preparing the transaction data before it is encrypted and transmitted. Like the 'SensoryNodes' and 'TinyDB' classes, it has no attributes, but it includes the 'prepare_data( )→dict' method, which organizes and formats the transaction data, ensuring it is ready for encryption by the AI module.

The 'ExternalDevice' class represents any external device that the neuromorphic smart card might interact with, such as a POS terminal or ATM. This class includes methods that facilitate the exchange of data between the device and the neuromorphic card system. The 'get_device_data( )→str' method retrieves the device's data pattern, while the 'get_n-short_code( )→str' method generates and returns the short code necessary for the transaction. The external device then receives the encrypted transaction data via the 'receive_n-transaction_data(encrypted_data: str)' method. Additionally, the 'send_sync_request( )→str' method allows the device to send a synchronization request, which is subsequently processed by the neuromorphic card system. The 'receive_sync_request(sync_request: str)' method captures this request, and the 'retrieve_sync_parameters( )→dict' method returns the synchronization parameters needed to update the system's records. Finally, the 'receive_sync_response(organized_sync_response: str)' method receives the organized synchronization response from the card system, completing the synchronization process.

The relationships between these classes are crucial for the overall functionality of the system. The 'NeuromorphicCardSystem' is composed of the 'SensoryNodes', 'NeuromorphicAIModule', 'TinyDB', and 'DataFeeder' classes, meaning that these components are integral to its operation. Additionally, the 'NeuromorphicCardSystem' associates with the 'ExternalDevice' class, indicating that it interacts with or relies on an external device to complete transactions. This association is essential for the smart card system to perform its primary function of securely processing and validating transactions, ensuring that all data exchanges are protected and accurately recorded.

Pseudocode examples are presented below in order to provide further illustration as to how one or more aspects of the disclosed inventions may be implemented. Various sections of the pseudocode correspond to specific aspects of the invention, from the initialization of the neuromorphic smart card system to the final synchronization of transaction data.

The detailed explanations are integrated into the pseudo-code, describing the functionality and purpose of each step in a narrative format.

```
    # Initialize the Neuromorphic Card System
    class NeuromorphicCardSystem:
        def_init_(self):
            # The system begins by initializing all the core
                components of the neuromorphic card.
            self.sensory_nodes=SensoryNodes( )
            self.ai_module=NeuromorphicAIModule( )
            self.tiny_db=TinyDB( )
            self.data_feeder=DataFeeder( )
            self.external_device=None
        def connect_to_external_device (self, device):
            # The neuromorphic card connects to an external
                device, such as a POS terminal or ATM.
            self.external_device=device
            print(f"Connected to external device: {device.get_
                device_info( )}")
        def activate_sensory_nodes(self):
            # The sensory nodes within the neuromorphic card
                are activated, ready to capture data.
            print("Activating sensory nodes . . . ")
            self.sensory_nodes.activate( )
        def capture_and_process_device_data(self):
            # Once the sensory nodes are activated, they capture
                the external device's data pattern and short code.
            print("Capturing device data pattern and short
                code . . . ")
            device_data,
                short_code=self.sensory_nodes.capture_data(self.
                external_device)
            # The sensory nodes then transmit this data to the AI
                module for further processing.
            print("Transmitting    captured    data    to    AI
                module . . . ")
            self.sensory_nodes.transmit_data(device_data,
                short_code)
        def validate_transaction (self):
            # The AI module retrieves a decode key from the
                TinyDB, which will be used to decrypt the short
                code.
            print("Retrieving decode key from TinyDB . . . ")
            decode_key=self.tiny_db.retrieve_decode_key(self.
                external_device)
            # The short code captured by the sensory nodes is
                decrypted using the retrieved decode key.
            print("Decrypting short code using the decode
                key . . . ")
            decrypted_short_code=self.ai_module.decrypt_
                short_code(short_code, decode_key)
            # The decrypted short code is compared with pre-
                stored data patterns to validate the transaction.
            print("Comparing decrypted short code with pre-
                stored data patterns . . . ")
            is_valid=self.ai_module.compare_short_code(de-
                crypted_short_code,    self.tiny_db.get_data_pat-
                terns( ))
            if is_valid:
                # If the comparison is successful, the AI module
                    generates a transaction approval signal.
                print("Transaction validated. Generating approval
                    signal . . . ")
                self.ai_module.generate_approval_signal( )
                # The Data Feeder is then signaled to prepare the
                    transaction data for secure transmission.
                self.prepare_transaction_data( )
```

```
            else:
                # If the comparison fails, the AI module generates
                    a rejection signal, terminating the transaction.
                print("Transaction validation failed. Generating
                    rejection signal . . . ")
                self.ai_module.generate_rejection_signal( )
        def prepare_transaction_data(self):
            # The Data Feeder prepares the transaction data,
                organizing it for encryption.
            print("Preparing transaction data . . . ")
            transaction_data=self.data_feeder.prepare_data( )
            # The AI module encrypts the prepared transaction
                data using an authorization encryption key.
            print("Encrypting transaction data with authoriza-
                tion encryption key . . . ")
            encrypted_data=self.ai_module.encrypt_data(trans-
                action_data)
            # The encrypted transaction data is then transmitted
                securely to the external device.
            print("Transmitting encrypted transaction data . . . ")
            self.transmit_transaction_data(encrypted_data)
        def transmit_transaction_data(self, encrypted_data):
            # The external device receives the encrypted trans-
                action data, completing the transaction phase.
            print("External device receiving encrypted transac-
                tion data . . . ")
            self.external_device.receive_transaction_data(en-
                crypted_data)
        def synchronize_data(self):
            # After the transaction, the card captures any syn-
                chronization requests from the external device.
            print("Capturing synchronization request . . . ")
            sync_request=self.capture_sync_request( )
            # The synchronization request is transmitted to the
                external device for processing.
            print("Transmitting synchronization request to exter-
                nal device . . . ")
            self.external_device.receive_sync_request(sync_re-
                quest)
            # The AI module retrieves synchronization param-
                eters such as updated credentials and logs.
            print("Retrieving synchronization parameters from
                external device . . . ")
            sync_parameters=self.external_device.retrieve_
                sync_parameters( )
            # The AI module generates a synchronization
                response that includes these updates.
            print("Generating synchronization response . . . ")
            sync_response=self.generate_sync_response(syn-
                c_parameters)
            # The synchronization response is encrypted to
                ensure secure transmission.
            print("Encrypting synchronization response . . . ")
            encrypted_sync_response=self.ai_module.encrypt_
                data(sync_response)
            # The encrypted synchronization response is orga-
                nized for transmission back to the external device.
            print("Organizing synchronization response for
                transmission . . . ")
            organized_sync_response=self.organize_sync_
                response(encrypted_sync_response)
            # The external device receives the encrypted syn-
                chronization response.
            print("Transmitting  encrypted  synchronization
                response to external device . . . ")
            self.external_device.receive_sync_response(orga-
                nized_sync_response)
```

```
        # Finally, the TinyDB is updated with the synchro-
            nization event and any changes confirmed by the
            system.
        print("Updating TinyDB with synchronization event
            and confirmed changes . . . ")
        self.tiny_db.update(sync_response)
    def capture_sync_request(self):
        # The card requests synchronization from the exter-
            nal device.
        print("Requesting synchronization from external
            device . . . ")
        return self.external_device.send_sync_request( )
    def generate_sync_response (self, sync_parameters):
        # The AI module compiles the synchronization
            response based on the retrieved parameters.
        print("Compiling synchronization response with
            updated credentials and logs . . . ")
        return {
            "updated_credentials": sync_parameters ["cre-
                dentials"],
            "logs": sync_parameters ["logs"]
        }
    def organize_sync_response (self, encrypted_sync_re-
        sponse):
        # The AI module organizes the encrypted synchro-
            nization response for transmission.
        print("Organizing    encrypted    synchronization
            response . . . ")
        return encrypted_sync_response
# Implementation of the Sensory Nodes
class SensoryNodes:
    def activate (self):
        # Activation logic for sensory nodes within the
            neuromorphic card.
        print("Sensory nodes activated.")
    def capture_data(self, external_device):
        # Capturing the external device's data pattern and the
            short code generated for the transaction.
        device_data=external_device.get_device_data( )
        short_code=external_device.get_short_code( )
        print(f"Captured data: {device_data}, short code:
            {short_code}")
        return device_data, short_code
    def transmit_data(self, device_data, short_code):
        # Transmitting the captured device data and short
            code to the AI module for further processing.
        print(f"Transmitting data: {device_data}, short
            code: {short_code} to AI module.")
# Implementation of the Neuromorphic AI Module
class NeuromorphicAIModule:
    def decrypt_short_code(self, short_code, decode_key):
        # Decrypting the short code using the decode key
            retrieved from the TinyDB.
        decrypted_code=decrypt(short_code, decode_key)
        print(f"Decrypted short code: {decrypted_code}")
        return decrypted_code
    def compare_short_code(self, decrypted_short_code,
        data_patterns):
        # Comparing the decrypted short code with the
            pre-stored data patterns to validate the transaction.
        if decrypted_short_code in data_patterns:
            print("Short code comparison successful.")
            return True
        else:
            print("Short code comparison failed.")
            return False
    def generate_approval_signal(self):
```

```
        # Generating an approval signal to indicate that the
            transaction is valid.
        print("Approval signal generated.")
    def generate_rejection_signal(self):
        # Generating a rejection signal to indicate that the
            transaction is invalid.
        print("Rejection signal generated.")
    def encrypt_data(self, data):
        # Encrypting the transaction or synchronization data
            using the authorization encryption key.
        encrypted_data=encrypt(data, authorization_key)
        print(f"Encrypted data: {encrypted_data}")
        return encrypted_data
# Implementation of the TinyDB
class TinyDB:
    def retrieve_decode_key(self, external_device):
        # Retrieving the appropriate decode key for the
            external device from the TinyDB.
        decode_key="sample_decode_key" # Example key
            retrieval
        print(f"Retrieved decode key: {decode_key} from
            TinyDB.")
        return decode_key
    def get_data_patterns(self):
        # Retrieving pre-stored data patterns from the
            TinyDB for transaction validation.
        data_patterns=["pattern1", "pattern2", "pattern3"] #
            Example patterns
        print(f"Retrieved data patterns: {data_patterns}
            from TinyDB.")
        return data_patterns
    def update (self, sync_response):
        # Updating the TinyDB with the synchronization
            event and confirmed changes after transmission.
        print(f"TinyDB updated with sync response: {syn-
            c_response}.")
# Implementation of the Data Feeder
class DataFeeder:
    def prepare_data(self):
        # Preparing the transaction data, formatting it for
            encryption and transmission.
        transaction_data={"transaction": "sample_data"} #
            Example data preparation
        print(f"Prepared transaction data: {transaction_
            data}.")
        return transaction_data
# Implementation of the External Device
class ExternalDevice:
    def get_device_data(self):
        # Retrieving the device data pattern for the transac-
            tion.
        return "device_data_pattern" # Example device data
            pattern
    def get_short_code(self):
        # Generating and retrieving the short code for the
            transaction.
        return "short_code" # Example short code
    def receive_transaction_data(self, encrypted_data):
        # Receiving the encrypted transaction data from the
            neuromorphic card.
        print(f"Received encrypted transaction data:
            {encrypted_data}.")
    def send_sync_request(self):
        # Sending a synchronization
            request to the neuromorphic card.
        return "sync_request" # Example synchronization
            request
```

```
def receive_sync_request(self, sync_request):
    # Receiving the synchronization request from the
        neuromorphic card.
    print(f"Received sync request: {sync_request}.")
def retrieve_sync_parameters(self):
    # Retrieving the synchronization parameters, such as
        updated credentials and logs.
    sync_parameters={
        "credentials": "updated_credentials",
        "logs": "transaction_logs"
    }
    print(f"Retrieved sync parameters: {sync_param-
        eters}.")
    return sync_parameters
def receive_sync_response (self, organized_sync_re-
    sponse):
    # Receiving the encrypted synchronization response
        from the neuromorphic card.
    print(f"Received encrypted sync response: {orga-
        nized_sync_response}.")
# Example usage of the system:
card_system=NeuromorphicCardSystem( )
external_device=ExternalDevice( )
# Step 1: Connect the neuromorphic card to an external
    device
card_system.connect_to_external_device(external_de-
    vice)
# Step 2: Activate sensory nodes and initiate transaction
    validation
card_system.activate_sensory_nodes( )
card_system.capture_and_process_device_data( )
card_system.validate_transaction( )
# Step 3: Synchronize the neuromorphic card with the
    external system after the transaction
card_system.synchronize_data( )
```

The foregoing exemplary pseudocode provides a sample illustration of implementation of various aspects of the invention. The system is designed to ensure that every transaction is handled securely and efficiently, utilizing the advanced features of the neuromorphic smart card and its components.

The process begins with the initialization of the neuromorphic card system, where all core components, including the sensory nodes, AI module, TinyDB, and Data Feeder, are set up. The system connects to an external device, such as a POS terminal or ATM, which will interact with the card during a transaction.

Once the connection is established, the sensory nodes are activated. These nodes are responsible for capturing the external device's data pattern and generating a short code for the transaction. The captured data and short code are then transmitted to the AI module, which retrieves the necessary decode key from the TinyDB. The AI module decrypts the short code and compares it with pre-stored data patterns to validate the transaction.

If the transaction is validated, the AI module generates an approval signal, and the Data Feeder prepares the transaction data. The prepared data is encrypted using an authorization encryption key and transmitted securely to the external device. If the transaction is approved, the system handles any synchronization requests to ensure that the card's internal records are updated accordingly.

The synchronization process involves capturing and transmitting synchronization requests, retrieving synchronization parameters, generating a synchronization response, and updating the TinyDB with the confirmed changes. The AI module plays a central role in encrypting and organizing the synchronization response for secure transmission back to the external device.

Throughout the pseudocode, each component's role is clearly defined, and the interactions between the components are carefully orchestrated to ensure the system operates smoothly and securely. This implementation demonstrates the complexity and sophistication of the neuromorphic smart card system, providing a robust framework for managing electronic transactions with the highest levels of security and efficiency.

Although the present technology has been described based on what is currently considered the most practical and preferred implementations, it is to be understood that this detail is only for that purpose and this disclosure is not limited to the sample descriptions and implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

More specifically, the neuromorphic smart card system described herein comprises a variety of sophisticated inventions, and there are a variety of potential alternate embodiments, configurations, and variations that could be utilized to enhance or modify its functionality as desired. These alternatives could be driven by different use cases, technological advancements, or specific requirements in various industries. All are within the scope and spirit of this application.

One possible variation involves the use of alternate communication protocols. While the system currently relies on standard protocols like NFC or other wireless methods, it could be adapted to incorporate more advanced communication technologies, such as quantum encryption for secure data transmission or 5G-based communication for faster and more reliable data exchange. Additionally, optical communication methods could be employed, where data is transmitted using light, offering increased security and speed, particularly in environments where wireless signals might be compromised.

Another alternative could involve integrating biometric authentication methods into the system, such as fingerprint scanning, facial recognition, or iris scanning. This would add an additional layer of security by ensuring that the person using the card is indeed the authorized user. The neuromorphic AI module could be enhanced to process biometric data alongside transaction data, thereby reducing the risk of fraudulent transactions. Furthermore, the system could be configured to integrate with blockchain technology, allowing it to execute smart contracts automatically. In this embodiment, the neuromorphic smart card could be used to trigger smart contracts on a blockchain, where the transaction data and validation process are recorded immutably. This would be particularly useful in financial services, supply chain management, or legal agreements where automated, secure, and transparent contract execution is essential.

An alternative configuration could involve designing the system with a modular and scalable architecture, where different components of the neuromorphic smart card system can be added or removed based on the specific needs of the user. For instance, in environments where high security is paramount, additional sensory nodes or enhanced AI modules could be incorporated to provide deeper levels of data analysis and validation. Conversely, in simpler use cases, certain components could be scaled back to reduce cost and complexity while still providing adequate security.

The system could also be designed with energy efficiency in mind. The current system might consume considerable power due to the complexity of its components, such as the AI module and sensory nodes. An energy-efficient variation could involve the use of low-power neuromorphic processors or alternative memory technologies like spintronics or magnetoresistive RAM (MRAM), which are known for their low energy consumption and high durability. This would be particularly beneficial in scenarios where the smart card is used frequently or in remote areas with limited access to power sources.

Additionally, the system could incorporate enhanced data privacy mechanisms. While the system already employs dynamic encryption and secure data storage, it could be adapted to include advanced privacy-preserving techniques such as homomorphic encryption, which allows data to be processed while still encrypted. This would ensure that even during validation and synchronization processes, sensitive data remains protected from potential breaches. Another variation could involve the use of secure multi-party computation (SMPC), where the transaction data is divided into multiple parts and processed separately to ensure that no single party has access to the entire dataset.

The system could also be integrated with Internet of Things (IoT) ecosystems, where the neuromorphic smart card interacts with various IoT devices in a secure manner. For example, the card could be used to authenticate and validate transactions or interactions with smart home devices, industrial sensors, or connected vehicles. This integration would enable secure, automated processes across a wide range of connected devices, enhancing both convenience and security in IoT environments.

Another possible variation involves expanding the AI-powered fraud detection capabilities of the system. The neuromorphic AI module could be expanded to include machine learning algorithms specifically designed for fraud detection. This would involve continuously analyzing transaction data, user behavior, and external device patterns to identify anomalies that might indicate fraudulent activity. The system could learn from past incidents and adapt its validation processes to prevent similar occurrences in the future, making it particularly useful in financial services where the risk of fraud is high.

In an alternate embodiment, certain aspects of the AI processing could be offloaded to a cloud-based system. While the core functionality of the neuromorphic card would remain local, complex data analysis and validation could be performed in the cloud, allowing for more sophisticated algorithms and real-time updates. This configuration would enable the system to handle more complex transactions and adapt more quickly to new threats or requirements, without being limited by the card's onboard processing power.

The neuromorphic card could also be offered in various form factors beyond the traditional credit card shape. For instance, it could be integrated into wearable devices, such as smartwatches or rings, allowing for more convenient and secure access to the card's functionalities. Alternatively, the system could be embedded in mobile devices or other personal electronics, providing users with a more seamless and integrated experience when performing secure transactions.

Another variation could include support for multiple users on a single card, where each user's data and transactions are separately managed and encrypted. This would be useful in family settings or for corporate cards where multiple employees need to access the same account. The system could be configured to authenticate each user individually, using their biometric data or a unique PIN, ensuring that all transactions are accurately attributed and securely processed.

Given the potential future threat posed by quantum computing to current encryption standards, an alternate embodiment could involve the integration of post-quantum cryptographic algorithms. This would ensure that the system remains secure even in a post-quantum world, where traditional encryption methods might be vulnerable. The neuromorphic AI module and the TinyDB could be adapted to handle these new cryptographic methods, ensuring that all transaction and synchronization data are protected against quantum attacks.

These alternate embodiments, configurations, and variations demonstrate the versatility and potential of the neuromorphic smart card system. By exploring different technological integrations, enhancements, and adaptations, the system can be tailored to meet the specific needs of various industries, applications, and future technological developments, ensuring that it remains at the forefront of secure transaction processing. All are within the scope of this disclosure.

The invention claimed is:

1. A method for securing electronic transactions using a neuromorphic intelligent card system, comprising the steps of:

providing a smart card with neuromorphic sensory nodes, a neuromorphic AI module, and a TinyDB, wherein the TinyDB is a memristor-based non-volatile storage device for retaining pre-stored data patterns and encryption keys;

activating the sensory nodes when the smart card is brought into proximity with an external device, wherein the sensory nodes capture a device data pattern and a short code generated by the external device;

transmitting the captured device data pattern and short code to the neuromorphic AI module;

retrieving, by the neuromorphic AI module, a decode key from the TinyDB based on the device data pattern;

decrypting, by the neuromorphic AI module, the short code using the decode key;

comparing, by the neuromorphic AI module, the decrypted short code with the pre-stored data patterns in the TinyDB to determine authenticity of the external device;

generating, by the neuromorphic AI module, a transaction approval signal if the decrypted short code matches the pre-stored data patterns, or a rejection signal if there is a mismatch;

signaling, by the neuromorphic AI module, a data feeder to prepare transaction data if the transaction approval signal is generated;

encrypting, by the data feeder, the transaction data with an authorization encryption key;

transmitting, by the smart card, the encrypted transaction data to the external device via a secure communication channel;

activating a data synchronization process if the transaction is approved, wherein the sensory nodes capture a synchronization request from the external device;

retrieving, by the neuromorphic AI module, synchronization parameters from the TinyDB in response to the synchronization request;

generating, by the neuromorphic AI module, a synchronization response that includes updated security credentials and transaction logs;

encrypting, by the neuromorphic AI module, the synchronization response with a synchronization encryption key;

organizing, by the data feeder, the encrypted synchronization response for transmission;

transmitting, by the smart card, the encrypted synchronization response to the external device via the secure communication channel; and updating, by the smart card, the TinyDB with a synchronization event and any changes to the security credentials or transaction records after receiving confirmation from the external device.

2. The method of claim 1, wherein the sensory nodes are further configured to capture additional data related to the external device's operational status and geographic location as part of the device data pattern.

3. The method of claim 2, wherein the neuromorphic AI module is configured to analyze the additional data captured by the sensory nodes to enhance accuracy of a device authentication process.

4. The method of claim 3, wherein the TinyDB stores historical transaction data, which the neuromorphic AI module uses in conjunction with the pre-stored data patterns for more accurate device authentication.

5. The method of claim 4, wherein the neuromorphic AI module is configured to generate a dynamic short code that serves as a temporary encryption key for securing the communication channel during the transaction process.

6. The method of claim 5, wherein the dynamic short code is generated based on factors including time of the transaction, the geographic location of the external device, and the operational status of the external device.

7. The method of claim 6, wherein the smart card is further configured to establish a secure connection with a mobile application, allowing the mobile application to update the TinyDB with the latest vendor-specific short codes and encryption keys.

8. The method of claim 7, wherein the data synchronization process includes receiving updated security credentials and encryption keys from the mobile application when available, and integrating these updates into the TinyDB.

9. The method of claim 8, wherein the smart card's data feeder is configured to organize the transaction data and synchronization response according to a predefined format to ensure compatibility with various external devices.

10. The method of claim 9, wherein the smart card is configured to log any transaction rejections in the TinyDB, creating a traceable record of all rejected transactions for security monitoring purposes.

11. The method of claim 10, wherein the neuromorphic AI module is configured to perform real-time learning based on transaction data and synchronization events, continuously updating the pre-stored data patterns in the TinyDB.

12. The method of claim 11, wherein the sensory nodes are further configured to detect and respond to physical tampering attempts by generating a tamper-evident signal that is recorded in the TinyDB.

13. The method of claim 12, wherein the neuromorphic AI module is configured to adaptively adjust security thresholds for device authentication based on the cardholder's transaction history and behavior patterns.

14. The method of claim 13, wherein the smart card is configured to transmit a security alert to the cardholder's mobile application in the event of a transaction rejection or tamper-evident signal detection.

15. The method of claim 14, wherein the smart card is further configured to initiate an automatic synchronization process with the mobile application when a predefined number of transactions have been completed.

16. The method of claim 15, wherein the smart card's TinyDB is configured to perform periodic self-checks to ensure the integrity and accuracy of the stored data, with any discrepancies being reported to the neuromorphic AI module for corrective action.

17. The method of claim 16, wherein the smart card is configured to operate in a low-power mode when not in use, with the memristor-based TinyDB retaining all critical data without requiring continuous power.

18. A method for securing electronic transactions using a neuromorphic intelligent card system, comprising the steps of:

providing a smart card with neuromorphic sensory nodes, a neuromorphic AI module, and a TinyDB, wherein the TinyDB is a memristor-based non-volatile storage device configured to store pre-stored data patterns, encryption keys, historical transaction data, synchronization logs, and tamper-evident signals;

activating the sensory nodes when the smart card is brought into proximity with an external device, wherein the sensory nodes are configured to capture a device data pattern, a short code generated by the external device, additional data related to the external device's operational status, geographic location, and any relevant contextual information;

generating a dynamic short code by the neuromorphic AI module, wherein the dynamic short code is generated based on factors including a specific time of the transaction, the geographic location of the external device, the operational status of the external device, and contextual data captured by the sensory nodes;

transmitting the captured device data pattern, short code, additional data, and the dynamic short code to the neuromorphic AI module;

retrieving, by the neuromorphic AI module, a decode key from the TinyDB based on the captured device data pattern and contextual information;

decrypting, by the neuromorphic AI module, the short code received from the external device using the decode key retrieved from the TinyDB;

comparing, by the neuromorphic AI module, the decrypted short code with the pre-stored data patterns, historical transaction data, and relevant contextual information stored in the TinyDB to determine authenticity and legitimacy of the external device;

analyzing the additional data captured by the sensory nodes, including the device's operational status and geographic location, to enhance accuracy of a device authentication process and to detect any anomalies;

generating, by the neuromorphic AI module, a transaction approval signal if the decrypted short code, additional data, and contextual information match the pre-stored data patterns and historical transaction data, or generating a rejection signal if a mismatch, anomaly, or any security threat is detected;

signaling, by the neuromorphic AI module, a data feeder to prepare the transaction data if the transaction approval signal is generated, wherein the data feeder organizes and formats the transaction data according to predefined secure formats;

encrypting, by the data feeder, the transaction data using the dynamic short code as an authorization encryption key, ensuring that the data is protected against unauthorized access or tampering;

transmitting, by the smart card, the encrypted transaction data to the external device through a secure communication channel, wherein the secure communication channel is established and maintained using the dynamic short code, providing an additional layer of security during data transmission;

logging any transaction rejections, anomalies, or detected security threats in the TinyDB, creating a detailed and traceable record of all rejected transactions, anomalies, and potential threats for continuous security monitoring and post-transaction analysis;

activating a data synchronization process if the transaction is approved, if a predefined number of transactions have been completed, or if the neuromorphic AI module detects that the smart card's data requires updating, wherein the sensory nodes capture a synchronization request from the external device or a linked mobile application;

retrieving, by the neuromorphic AI module, synchronization parameters, updated security credentials, and any pending transaction logs from the TinyDB in response to the synchronization request;

comparing the synchronization request and related data with the stored data in the TinyDB to ensure that the request is valid, consistent, and aligned with the card's current records and operational state;

generating, by the neuromorphic AI module, a synchronization response that includes updated security credentials, transaction logs, and any required synchronization updates, ensuring that the smart card's data remains current and secure;

encrypting, by the neuromorphic AI module, the synchronization response using a synchronization encryption key that is dynamically generated based on current synchronization parameters, ensuring that the response is protected during transmission;

organizing and formatting the encrypted synchronization response by the data feeder, ensuring compatibility with various external devices, including the POS terminal and any linked mobile applications;

transmitting, by the smart card, the encrypted synchronization response to the external device via the secure communication channel, ensuring that the synchronization process is completed without exposing the data to unauthorized parties;

updating, by the smart card, the TinyDB with the details of a synchronization event, including any changes to the security credentials, transaction records, or other critical data, after receiving confirmation from the external device that the synchronization has been successfully completed;

establishing a secure connection with a mobile application, wherein the mobile application is configured to update the TinyDB with the latest vendor-specific short codes, encryption keys, and security credentials, ensuring that the smart card remains up-to-date with the latest security protocols and vendor information;

performing real-time learning and adaptive analysis by the neuromorphic AI module based on transaction data, synchronization events, and cardholder behavior patterns, continuously updating the pre-stored data patterns and security thresholds in the TinyDB to enhance the accuracy of device authentication and the detection of potential threats;

detecting and responding to physical tampering attempts through the sensory nodes, wherein any detected tampering is immediately logged as a tamper-evident signal in the TinyDB and flagged for further investigation by the neuromorphic AI module;

adaptively adjusting the security thresholds for device authentication based on the cardholder's transaction history, geographic patterns, operational environment, and behavior patterns, ensuring that the smart card provides a personalized and context-aware security response;

transmitting a security alert to the cardholder's mobile application in the event of a transaction rejection, detected anomaly, or tamper-evident signal, allowing the cardholder to take immediate action or review a security incident;

initiating an automatic synchronization process with the mobile application or external device when a predefined number of transactions have been completed, when the smart card detects a significant update is required, or when an anomaly in the transaction history is detected, ensuring that the card's data is consistently maintained;

performing periodic self-checks by the TinyDB, wherein the self-checks verify integrity, accuracy, and consistency of the stored data, and any discrepancies or potential issues are reported to the neuromorphic AI module for immediate corrective action, maintaining overall reliability and security of the smart card; and operating the smart card in a low-power mode when not in use, wherein the memristor-based TinyDB retains all critical data, security credentials, and transaction logs without requiring continuous power, allowing the smart card to conserve energy while ensuring that it remains fully functional and secure at all times.

19. A system for securing electronic transactions using a neuromorphic intelligent card, comprising:

a smart card comprising neuromorphic sensory nodes configured to capture a device data pattern, a short code generated by an external device, additional data related to the external device's operational status, geographic location, and contextual information when the smart card is brought into proximity with the external device;

a neuromorphic AI module integrated within the smart card, wherein the neuromorphic AI module is configured to generate a dynamic short code based on factors including a specific time of the transaction, the geographic location of the external device, the operational status of the external device, and the contextual information captured by the sensory nodes;

a memristor-based TinyDB within the smart card, wherein the TinyDB is a non-volatile storage device configured to store pre-stored data patterns, encryption keys, historical transaction data, synchronization logs, tamper-evident signals, and any additional data captured by the sensory nodes;

a data feeder integrated within the smart card, wherein the data feeder is configured to organize, format, and encrypt transaction data and synchronization responses for secure transmission;

the neuromorphic AI module further configured to retrieve a decode key from the TinyDB based on the device data pattern and contextual information, decrypt the short code using the decode key, and compare the decrypted short code with the pre-stored data patterns, historical transaction data, and contextual information stored in the TinyDB to determine authenticity and legitimacy of the external device;

the neuromorphic AI module further configured to analyze the additional data captured by the sensory nodes, including the operational status and geographic location of the external device, to enhance accuracy of a device authentication process and detect any anomalies; the neuromorphic AI module further configured to generate a transaction approval signal if the decrypted short code, additional data, and contextual information match the pre-stored data patterns and historical transaction data, or generate a rejection signal if a mismatch, anomaly, or security threat is detected;

the data feeder configured to prepare and encrypt transaction data with the dynamic short code as an authorization encryption key upon receiving the transaction approval signal from the neuromorphic AI module; the smart card further configured to transmit the encrypted transaction data to the external device through a secure communication channel established using the dynamic short code, wherein the secure communication channel is maintained to ensure the security of data transmission;

the smart card further configured to log any transaction rejections, anomalies, or detected security threats in the TinyDB, creating a detailed and traceable record for security monitoring and post-transaction analysis; the neuromorphic AI module further configured to activate a data synchronization process if the transaction is approved, if a predefined number of transactions have been completed, or if the smart card's data requires updating, wherein the sensory nodes capture a synchronization request from the external device or a linked mobile application;

the neuromorphic AI module further configured to retrieve synchronization parameters, updated security credentials, and transaction logs from the TinyDB in response to the synchronization request, compare the synchronization request with stored data in the TinyDB, and generate a synchronization response that includes updated security credentials, transaction logs, and any required synchronization updates; the neuromorphic AI module further configured to encrypt the synchronization response with a synchronization encryption key dynamically generated based on current synchronization parameters;

the data feeder further configured to organize and format the encrypted synchronization response for transmission, ensuring compatibility with various external devices and linked mobile applications;

the smart card further configured to transmit the encrypted synchronization response to the external device via the secure communication channel and update the TinyDB with the details of a synchronization event, including any changes to security credentials or transaction records after receiving confirmation from the external device; the smart card further configured to establish a secure connection with a mobile application, wherein the mobile application is configured to update the TinyDB with the latest vendor-specific short codes, encryption keys, and security credentials to ensure that the smart card remains up-to-date with the latest security protocols and vendor information;

the neuromorphic AI module further configured to perform real-time learning and adaptive analysis based on transaction data, synchronization events, and cardholder behavior patterns, continuously updating the pre-stored data patterns and security thresholds in the TinyDB to enhance device authentication accuracy and detect potential threats;

the sensory nodes further configured to detect physical tampering attempts and respond by generating a tamper-evident signal, which is logged in the TinyDB and flagged for further investigation by the neuromorphic AI module;

the neuromorphic AI module further configured to adaptively adjust security thresholds for device authentication based on the cardholder's transaction history, geographic patterns, operational environment, and behavior patterns, providing a personalized and context-aware security response;

the smart card further configured to transmit a security alert to the cardholder's mobile application in the event of a transaction rejection, detected anomaly, or tamper-evident signal, enabling the cardholder to take immediate action or review the security incident;

the smart card further configured to initiate an automatic synchronization process with the mobile application or external device when a predefined number of transactions have been completed, when a significant update is required, or when an anomaly in the transaction history is detected, ensuring consistent data maintenance;

the TinyDB further configured to perform periodic self-checks to verify the integrity, accuracy, and consistency of the stored data, with any discrepancies reported to the neuromorphic AI module for corrective action to maintain reliability and security of the smart card; and the smart card further configured to operate in a low-power mode when not in use, wherein the memristor-based TinyDB retains all critical data, security credentials, and transaction logs without requiring continuous power, ensuring that the smart card conserves energy while remaining fully functional and secure.

20. The system of claim 19, wherein the neuromorphic AI module is further configured to dynamically adapt and select encryption algorithms for both the authorization encryption key and the synchronization encryption key based on a comprehensive, real-time analysis of multiple transaction environment variables, including but not limited to security level and firmware version of the external device, the geographic location of the transaction, the frequency and timing of transactions at a specific location, historical data of transaction patterns, and any detected anomalies or patterns of attempted security breaches, wherein the neuromorphic AI module assesses a risk profile of each transaction and selects the most appropriate encryption algorithm from a plurality of available encryption algorithms to balance between maximizing security and maintaining optimal processing efficiency, further comprising a continuous monitoring mechanism within the neuromorphic AI module that updates and refines an encryption algorithm selection criteria stored in the TinyDB based on evolving transaction environments and emerging security threats, and wherein the smart card is additionally configured to store these algorithm selections and adjustments in the TinyDB for reference and application in future transactions and synchronization events, ensuring that the card adapts to new threats and environmental changes over time while maintaining a high level of security and operational efficiency.

\* \* \* \* \*